(12) United States Patent
Herr et al.

(10) Patent No.: US 10,852,272 B2
(45) Date of Patent: Dec. 1, 2020

(54) DEVICES AND METHODS USING PORE SIZE MODULATION FOR DETECTING ANALYTES IN A FLUID SAMPLE

(71) Applicant: The Regents of the University of California, Oakland, CA (US)

(72) Inventors: Amy E. Herr, Oakland, CA (US); Todd A. Duncombe, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 172 days.

(21) Appl. No.: 15/310,069

(22) PCT Filed: Jun. 4, 2015

(86) PCT No.: PCT/US2015/034266
§ 371 (c)(1),
(2) Date: Nov. 9, 2016

(87) PCT Pub. No.: WO2015/187990
PCT Pub. Date: Dec. 10, 2015

(65) Prior Publication Data
US 2017/0241946 A1 Aug. 24, 2017

Related U.S. Application Data

(60) Provisional application No. 62/008,413, filed on Jun. 5, 2014.

(51) Int. Cl.
*G01N 27/447* (2006.01)
*B01J 20/285* (2006.01)
(Continued)

(52) U.S. Cl.
CPC ....... *G01N 27/44739* (2013.01); *B01D 15/20* (2013.01); *B01D 15/3871* (2013.01);
(Continued)

(58) Field of Classification Search
None
See application file for complete search history.

(56) References Cited

U.S. PATENT DOCUMENTS 5,149,416 A * 9/1992 Osterhoudt ........... C08F 220/54
204/456
5,569,364 A 10/1996 Hooper et al.
(Continued)

FOREIGN PATENT DOCUMENTS

| WO | 2010135364 | 5/2010 |
| WO | 2011142781 | 11/2011 |
| WO | 2012177940 | 12/2012 |

OTHER PUBLICATIONS

Hughes et al. (Proc. Natl. Acad. Sci. USA 109(16):5972-5977 (Year: 2012).*

*Primary Examiner* — Gurpreet Kaur
*Assistant Examiner* — Steven E Rosenwald
(74) *Attorney, Agent, or Firm* — Rudy J. Ng; Bozicevic, Field & Francis LLP

(57) ABSTRACT

Provided are devices that include a polymeric separation medium configured to immobilize one or more constituents of interest in the polymeric separation medium and have an increased pore size upon application of an applied stimulus. Systems including the devices, as well as methods of using the devices, are also provided. Embodiments of the present disclosure find use in a variety of different applications, including detecting whether an analyte is present in a fluid sample.

24 Claims, 13 Drawing Sheets

(51) Int. Cl.
  *B01D 15/38*   (2006.01)
  *B01D 15/20*   (2006.01)
  *B01D 17/06*   (2006.01)
  *B01J 20/26*   (2006.01)
  *G01N 30/52*   (2006.01)

(52) U.S. Cl.
  CPC ..... *B01D 15/3876* (2013.01); *B01D 15/3885* (2013.01); *B01D 17/06* (2013.01); *B01J 20/267* (2013.01); *B01J 20/285* (2013.01); *G01N 27/44726* (2013.01); *G01N 27/44734* (2013.01); *G01N 27/44747* (2013.01); *G01N 27/44756* (2013.01); *G01N 2030/525* (2013.01)

(56) References Cited

U.S. PATENT DOCUMENTS

| | | | |
|---|---|---|---|
| 9,110,057 B2 | 8/2015 | Herr et al. | |
| 2003/0205527 A1 | 11/2003 | Yoshizako et al. | |
| 2003/0210997 A1 | 11/2003 | Lopez et al. | |
| 2010/0044316 A1* | 2/2010 | Childs | B01D 67/0006 210/679 |
| 2011/0232865 A1 | 9/2011 | Mildner | |
| 2012/0329040 A1* | 12/2012 | Herr | B01L 3/5023 435/5 |
| 2013/0017229 A1* | 1/2013 | Mooney | A61K 9/0009 424/400 |

* cited by examiner

DEVICES AND METHODS USING PORE SIZE MODULATION FOR DETECTING ANALYTES IN A FLUID SAMPLE

CROSS-REFERENCE TO RELATED APPLICATION

Pursuant to 35 U.S.C. § 119(e), this application claims priority to the filing date of U.S. Provisional Application No. 62/008,413, filed Jun. 5, 2014, the disclosure of which is incorporated herein by reference.

REFERENCE TO GOVERNMENT SUPPORT

This invention was made with government support under grant number CBET-1056035 awarded by the National Science Foundation. The government has certain rights in the invention.

BACKGROUND

A variety of analytical techniques may be used to separate and detect specific analytes in a given sample. A range of related immunoblotting methods have enabled the identification and semi-quantitative characterization of e.g., DNA (Southern blot), RNA (northern blot), proteins (Western blot), and protein-protein interactions (far-western blot); by coupling biomolecule separations and assays. For example, Western blotting can be used to detect proteins in a sample by using gel electrophoresis to separate the proteins in the sample followed by probing with antibodies specific for the target protein. In a typical Western blot, a separation of biomolecules is performed in a dense polymer sieving matrix. After the separation, biomolecules are transferred orthogonally via diffusion or electrophoresis onto a blotting membrane (e.g., polyvinyldenefluoride or nitrocellulose) which they adsorb onto through hydrophobic and electrostatic interactions. Following the transfer, membranes are blocked to prevent non-specific adsorption of reagents. After blocking, the membranes are soaked in the reagents of interest—large reagents can be readily delivered via diffusion due to the large pore-size of the blotting membranes.

SUMMARY

Recognized herein are various limitations with conventional blotting techniques. For example, conventional blotting techniques, as discussed above, may result in separation resolution losses during membrane transfer, and may require labor-intensive, time consuming, multi-step procedures carried out by a trained technician, and thus may be impractical for use in a clinical setting. In addition, conventional blotting techniques may be susceptible to transfer size bias, where small molecules blot with higher efficiency than larger molecules, or transfer blotting bias, where molecular hydrophobicity affects blotting efficiency. Similarly, for typical commercial kits for in-gel large reagent delivery without biomolecule immobilization there is a tradeoff between poor separation performance in low density polymers and poor reagent delivery in high density polymers. In addition, typical in-gel large reagent delivery without biomolecule immobilization may be susceptible to separation resolution losses during reagent delivery, where small molecules may be especially affected and long analysis times, where reagent delivery may take extended periods of time due to the relatively small pores in the polymer matrix.

Provided are devices that include a polymeric separation medium configured to immobilize one or more constituents of interest in the polymeric separation medium and have an increased pore size upon application of an applied stimulus. Systems including the devices, as well as methods of using the devices, are also provided. Embodiments of the present disclosure find use in a variety of different applications, including detecting whether an analyte is present in a fluid sample.

Aspects of the present disclosure include a device having a polymeric separation medium configured to immobilize one or more constituents of interest in the polymeric separation medium and have an increased pore size upon application of an applied stimulus. For example, the device may include a polymeric separation medium that immobilizes one or more constituents of interest in the polymeric separation medium and has an increased pore size upon application of an applied stimulus.

In some embodiments, the polymeric separation medium includes a non-labile crosslinker configured to crosslink the polymeric separation medium, and a labile crosslinker configured to crosslink the polymeric separation medium and de-crosslink upon application of the applied stimulus.

In some embodiments, the labile crosslinker is selected from an acid cleaved crosslinker, an alkaline cleaved crosslinker, an oxidation cleaved crosslinker, a reduction cleaved crosslinker, a molecular affinity crosslinker, a heat cleaved crosslinker, a photo cleaved crosslinker, a solvent cleaved crosslinker, and an ionic crosslinker.

In some embodiments, the labile crosslinker includes ethylene glycol diacrylate (EDA), N,N'-(1,2-dihydroxyethylene)bisacrylamide (DHEBA), N—N'-diallyltartardiamide (DATD), N,N'-bis(acryloyl)cystamine (BAC), N,N'-(7,7-dimethyl-3,6,8,11-tetraoxatridecane-1,13-diyl)diacrylamide (DOK), N,N'-[(1-methylethylidene)bis(oxy-2,1-ethanediyl)]diacrylamide (DK), or alginate.

In some embodiments, the molar ratio of the labile crosslinker to total crosslinker ranges from 0.5 to 1.

In some embodiments, the polymeric separation medium has pore size that depends on total crosslinker content, % C, which is 15% or less before application of the applied stimulus.

In some embodiments, the polymeric separation medium has a pore size that depends on total crosslinker content, % C, which is 5% or less after application of the applied stimulus.

In some embodiments, the polymeric separation medium includes a dissolvable polymer. In some embodiments, the dissolvable polymer includes a thermoplastic polymer and a thermoset polymer.

In some embodiments, the thermoplastic polymer includes an agarose gel. In some embodiments, the applied stimulus is heat.

In some embodiments, the polymeric separation medium includes a swellable polymer. In some embodiments, the applied stimulus is heat, light or a solvent.

In some embodiments, the polymeric separation medium includes functional groups that covalently bond to one or more of the constituents of interest in the polymeric separation medium. In some embodiments, the functional groups are light-activated functional groups or chemically-activated functional groups.

Aspects of the present disclosure include a method of detecting an analyte in a fluid sample. The method includes introducing a fluid sample into a device having a polymeric separation medium configured to immobilize one or more constituents of interest in the polymeric separation medium and have an increased pore size upon application of an applied stimulus, applying an electric field across the polymeric separation medium in a manner sufficient to produce separated sample components in the polymeric separation medium, and detecting the analyte in the separated sample. For example, the method may include: introducing a fluid sample into a device having a polymeric separation medium that immobilizes one or more constituents of interest in the polymeric separation medium and has an increased pore size upon application of an applied stimulus; applying an electric field across the polymeric separation medium in a manner sufficient to separate components of the fluid sample in the polymeric separation medium to provide a separated sample; and detecting the analyte in the separated sample.

In some embodiments, the method includes immobilizing components in the polymeric separation medium. For example, the method may include immobilizing the separated sample components in the polymeric separation medium.

In some embodiments, the method includes contacting the polymeric separation medium with the applied stimulus.

In some embodiments, the applied stimulus is selected from an acid, a base, an oxidizing agent, a reducing agent, an affinity agent, heat, light, and a solvent.

In some embodiments, the detecting includes labeling the analyte in the separated sample.

In some embodiments, the method includes contacting the separated sample components with one or more secondary reagents. In some embodiments, the contacting includes use of one or more of diffusion, electrokinetic transport and hydrodynamic transport. In some embodiments, the one or more secondary reagents are selected from an affinity probe, a dye, an antibody, an enzyme, an enzyme substrate and a nucleic acid.

Aspects of the present disclosure include a system that includes a device according to embodiments of the present disclosure, and a detector. For example, the system may include a device according to embodiments of the present disclosure, and a detector operatively coupled to the device.

Aspects of the present disclosure include a kit that includes a device according to embodiments of the present disclosure, and a packaging configured to contain the device.

In some embodiments, the kit includes instructions for using the device to detect an analyte in a fluid sample.

BRIEF DESCRIPTION OF THE FIGURES

FIG. 9, panel B, shows a photo of a DK solution at 500 mM, which has a yellow hue. FIG. 9, panel C, shows an image of photopatterned 100% DK free-standing polyacrylamide gel (fsPAG) structures, which were used to qualitatively assess decrosslinking in acidic conditions. The fsPAG morphology was monitored for the DK PAGs in tris glycine solutions titrated to 8.3, 7.1, 2.6 and 0.07 pH at time points 2 minutes, 5 minutes, 1 hour, 2 hours, and overnight (at room temperature). For gel structures in the 2.6 pH and 0.07 pH, complete dissolution was observed in the first five minutes.

FIG. 10, panel A, shows a graph of the elastic modulus for the PAG after exposure to the various buffers for 10 minutes and 1 day. The initial elastic modulus for all conditions stiffness was determined as the initial measurement done for the tris caps gels. For tris caps, PBS, and 0.01% HCl the gel was stable over the course of day. In contrast, exposure to 1% and 0.1% HCl resulted in a dramatic shift in average elastic modulus from 45 kPa to 2.5 kPa and 2.8 kPa, respectively. In 10 minutes of exposure, the majority of gel alteration was completed for 1% HCl condition which had an average elastic modulus of 4.0 kPa. FIG. 10, panel B, shows a graph of the storage modulus, and FIG. 10, panel C, shows a graph of the loss modulus for the various conditions after a 10 minute exposure. The increased loss modulus for the 1% HCl and 0.1% HCl was consistent with a highly disordered and poorly crosslinked PAG that would be expected after decrosslinking DK.

FIG. 11, panel A, shows images of an scWB assay that was run using a DK and BIS crosslinked 16% T*, 6% C* and 98% DK PAG for MCF7-GFP expressing cells. The GFP (top row) and probed-GFP (bottom row) signals are displayed for a decrosslinked and a control gel for three adjacent wells that contained cells. The microarray scanning conditions and image contrasts were constant for each color channel. Clear antibody probing was seen in the decrosslinked gel, while no signal was observed in the control. FIG. 11, panel B, shows a graph of the probing efficiency, defined as the fluorescent integral of the antibody probed signal divided by the GFP signal, which was evaluated for decrosslinked gels with the densities 12% T*, 16% T* and 18% T*. A decrease in signal was observed with an increasing gel density. FIG. 11, panel C, shows a graph used to determine the optimal decrosslinking ratio for antibody probing. 16% T* PAGs with 90%, 98%, 99% and 100% DK crosslinker abundances were tested and are shown in a Box plot. The maximum probing efficiency was determined to be 99% DK, which was used for all conditions of the gel compositions. The 100% DK crosslinked gels were not completely dissolved in the acid treatment. This may be related to side reactions during polymerization or impurity in the DK sample. The lower probing efficiency observed in the 100% DK gel may be caused by diffusive loss of GFP after decrosslinking has broken their connection with the gel matrix.

FIG. 12, panel A, shows a graph of antibody probing efficiency, calculated by normalizing the RFU from the secondary antibody probe with the initial turboGFP signal for each analyzed lane, which was shown to decrease as gel density was increased from 6% T to 12% T by $10^2$ at a 1/10 antibody dilution and $10^3$ at a 1/20 antibody dilution in uniform polyacrylamide gels (no decrosslinker). FIG. 12, panel B, shows a graph assessing probing bias along the separation axis in gradient gels, turboGFP was electrophoresed for 10 s, 15 s, 20 s or 30 s to sample different locations along the gradient in BIS and DK/BIS crosslinked gradient gels. FIG. 12, panel C, shows a graph indicating that along the separation axis, the BIS gel showed a reduction in probing efficiency from 13.6 to 1.36 from the 275 μm to 673 μm migration distances, respectively. In contrast, in the decrosslinked gel probing efficiency was minimally impacted along the separation axis, from 2.69 to 2.33 from the 338 μm to 946 μm migration distances, respectively. The averaged antibody probed signal is shown for the BIS (FIG. 12, panel D), and the DK/BIS gradient gels (FIG. 12, panel D).

FIG. 13, panel A, shows an image of an scWB assay that was run with a U373-GFP cell line for different time electrophoresis time points—30 s, 50 s, and 75 s. In the non-decrosslinked control, no probing was observed at any point along the gradient—high contrast images for the anti-GFP (FIG. 13, panel A, bottom row) are shown to highlight that no signal was observed at the location of the immobilized GFP (see FIG. 13, panel A, top row). For the decrosslinked gel, significant antibody probing was observed for all points along the gradient. FIG. 13, panel B, shows a graph indicating that probing efficiency for each electrophoresis time in the decrosslinked gel were similar, indicating no probing bias in the gradient gel.

DETAILED DESCRIPTION

Figure 1:
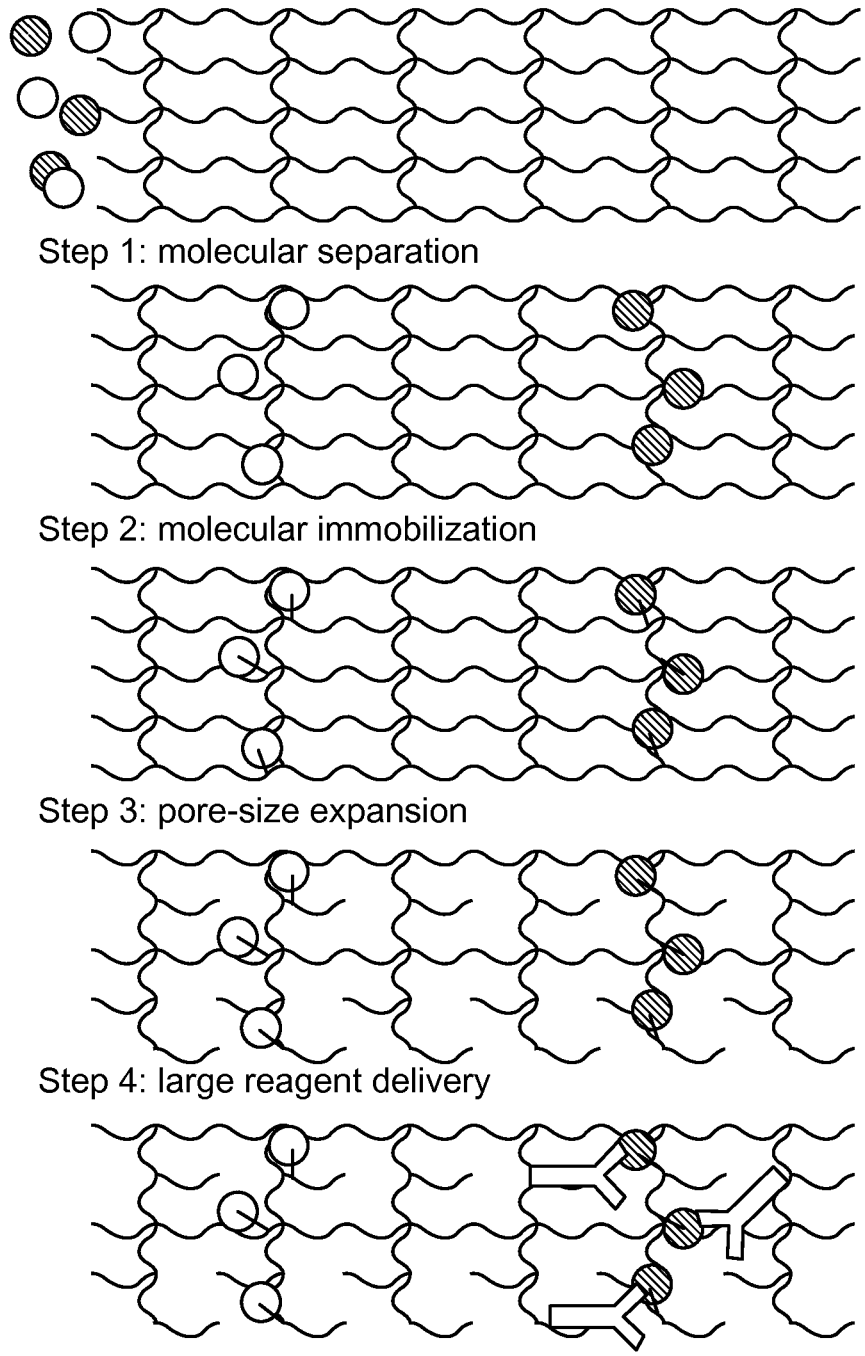
FIG. 1 shows a schematic drawing of an assay protocol using a polymeric separation medium, according to embodiments of the present disclosure.

Provided are devices that include a polymeric separation medium configured to immobilize one or more constituents of interest in the polymeric separation medium and have an increased pore size upon application of an applied stimulus. Systems including the devices, as well as methods of using the devices, are also provided. Embodiments of the present disclosure find use in a variety of different applications, including detecting whether an analyte is present in a fluid sample.

Below, the subject devices are described first in greater detail. Methods of separating constituents of a fluid sample are also disclosed in which the subject devices find use. In addition, systems and kits that include the subject devices are also described.

Devices

Aspects of the present disclosure include devices for separating constituents of a fluid sample. The device includes a polymeric separation medium configured to immobilize one or more constituents of interest in the polymeric separation medium and have an increased pore size upon application of an applied stimulus. A polymeric separation medium configured as such may be used to separate constituents of a fluid sample to obtain separation of one or more analytes of interest from the sample. In addition, a polymeric separation medium configured to immobilize one or more constituents of interest (e.g., analytes of interest) in the polymeric separation medium may facilitate maintaining the separation of the constituents of interest while subsequent analysis is performed, such as detection of the separated constituents of interest. For example, immobilization of the separated constituents of interest in the polymeric separation medium may facilitate a minimization in diffusion or dispersion of the separated constituents of interest.

In addition, a polymeric separation medium configured to have an increased pore size upon application of an applied stimulus may facilitate detection of the separated constituents of interest in the polymeric separation medium. For example, in some instances, labeled antibodies may be used to detect the separated constituents of interest immobilized in the polymeric separation medium. However, a polymeric separation medium optimized to perform separation of the constituents of interest from a sample as described above, may have an average pore size that restricts accessibility of the labeled antibodies into the polymeric separation medium. Thus, in certain embodiments of the polymeric separation medium described herein, the polymeric separation medium is configured to have an increased pore size upon application of an applied stimulus. An increase in average pore size of the polymeric separation medium (e.g., following immobilization of the separated constituents of interest in the polymeric separation medium) may facilitate detection of the separated constituents of interest by making the polymeric separation medium more accessible to the labeled antibodies. Stated another way, an increase in average pore size of the polymeric separation medium may facilitate the transport of the labeled antibodies through the polymeric separation medium to the immobilized constituents of interest, such that the immobilized constituents of interest may be labeled by the antibodies and detected.

As described herein, in certain embodiments, the device includes a polymeric separation medium configured to immobilize one or more constituents of interest in the polymeric separation medium and have an increased pore size upon application of an applied stimulus. By increased pore size is meant that the polymeric separation medium may have an initial average pore size, and upon application of an applied stimulus to the separation medium, the average pore size of the separation medium may be increased as compared to the initial average pore size. By "average" is meant the arithmetic mean.

In some instances, the average pore size of the polymeric separation medium increases upon application of the applied stimulus by 1% or more as compared to the initial average pore size, such as an increase of 2% or more, or 3% or more, or 4% or more, or 5% or more, or 6% or more, or 7% or more, or 8% or more, or 9% or more, or 10% or more, or 15% or more, or 20% or more, or 25% or more, or 30% or more, or 35% or more, or 45% or more, or 50% or more.

In some instances, the increase in average pore size of the polymeric separation medium may be indirectly assessed by measuring the elastic modulus of the polymeric separation medium. For instance, a polymeric separation medium before application of the applied stimulus may have an elastic modulus of 5 kPa or more, such as 6 kPa or more, or 7 kPa or more, or 8 kPa or more, or 9 kPa or more, or 10 kPa or more, or 11 kPa or more, or 12 kPa or more, or 13 kPa or more, or 14 kPa or more, or 15 kPa or more, or 16 kPa or more, or 17 kPa or more, or 18 kPa or more, or 19 kPa or more, or 20 kPa or more. For example, the polymeric separation medium before application of the applied stimulus may have an elastic modulus of 12 kPa or more (e.g., 12 kPa). In some cases, the polymeric separation medium after application of the applied stimulus has an elastic modulus of 20 kPa or less, such as 19 kPa or less, or 18 kPa or less, or 17 kPa or less, or 16 kPa or less, or 15 kPa or less, or 14 kPa or less, or 13 kPa or less, or 12 kPa or less, or 11 kPa or less, or 10 kPa or less, or 9 kPa or less, or 8 kPa or less, or 7 kPa or less, or 6 kPa or less, or 5 kPa or less, or 4 kPa or less, or 3 kPa or less, or 2 kPa or less or 1 kPa or less. For example, the polymeric separation medium after application of the applied stimulus may have an elastic modulus of 2 kPa or less (e.g., 2 kPa).

In some instances, the increase in average pore size of the polymeric separation medium may be indirectly assessed by observing the change in mobility for analytes (e.g., proteins) migrating through the polymeric separation medium. For instance, a polymeric separation medium after application of the applied stimulus may have a mobility for analytes traversing the separation medium that increases by 5% or more, such as 10% or more, or 15% or more, or 20% or more, or 25% or more, or 30% or more, or 35% or more, or 40% or more, or 45% or more, or 50% or more. In some cases, analytes traversing the polymeric separation medium have an increase in mobility of 40% or more after application of the applied stimulus to the polymeric separation medium.

In certain embodiments, the polymeric separation medium includes a polyacrylamide polymer. In certain cases, the polyacrylamide polymer is formed from acrylamide and bisacrylamide monomers. In some cases, the pore size of the separation medium depends on the total acrylamide content, % T, (T=total concentration of acrylamide and bisacrylamide monomer), ranging from 1% to 50%, or from 1% to 40%, or from 1% to 30%, such as from 1% to 25%, including from 1% to 20%, or from 1% to 15%, or from 1% to 10%. In some cases, the % T is 20%. In some cases, the % T is 18%. In some cases, the % T is 16%. In some cases, the % T is 14%. In some cases, the % T is 12%. In some cases, the % T is 10%. In some cases, the % T is 8%. In some cases, the % T is 6%.

In certain embodiments, the polymeric separation medium includes one or more crosslinkers. A crosslinker is a moiety that can form bonds (e.g., covalent bonds, ionic bonds, etc.) between monomers and/or polymers of the polymeric separation medium. In some cases, the pore size of the separation medium depends on the total crosslinker content, % C, ranging from 1% to 25%, or from 1% to 20%, or from 1% to 15%, 1% to 15%, or from 1% to 10%, or from 1% to 9%, such as from 1% to 8%, including from 1% to 7%, or from 1% to 6%, or from 1% to 5%, or from 1% to 4%, or from 1% to 3%, or from 1% to 2%. In some cases, the total crosslinker content is the total of the amount of labile and non-labile crosslinkers. In certain embodiments, the total crosslinker content is 10%. In certain embodiments, the total crosslinker content is 15%. In certain embodiments, the total crosslinker content of the polymeric separation medium before application of the applied stimulus is 10%. In certain embodiments, the total crosslinker content of the polymeric separation medium before application of the applied stimulus is 15%. In certain embodiments, the total crosslinker content of the polymeric separation medium after application of the applied stimulus is 5% or less. In certain embodiments, the total crosslinker content is about 3% (e.g., 3.3%). In certain embodiments, the crosslinker content of the polymeric separation medium after application of the applied stimulus is 5% or less. In certain embodiments, the crosslinker content of the polymeric separation medium after application of the applied stimulus is about 3%.

In certain embodiments, the polymeric separation medium includes a non-labile crosslinker. The non-labile crosslinker may be configured to crosslink the polymeric separation medium. For example, a non-labile crosslinker may be a moiety that can form stable covalent bonds between monomers and/or polymers of the polymeric separation medium. By "non-labile" is meant that the crosslinker is substantially stable and does not significantly decrosslink upon application of the applied stimulus. For instance, a non-labile crosslinker may be a moiety that forms stable covalent bonds between monomers and/or polymers of the polymeric separation medium where the covalent bonds are not substantially disrupted upon application of the applied stimulus. By "decrosslink" is meant that a crosslink (e.g., covalent bond) between monomers and/or polymers of the polymeric separation medium is disrupted such that the crosslink (e.g., covalent bond) between the previously linked monomers and/or polymers of the polymeric separation medium is no longer present. In some instances, "decrosslinking" is referred to herein as "dissolving" or "dissolution" of the labile crosslinker.

In certain embodiments, the polymeric separation medium includes a labile crosslinker. The labile crosslinker may be configured to crosslink the polymeric separation medium and decrosslink upon application of the applied stimulus. For example, a labile crosslinker may be a moiety that can form bonds (e.g., covalent bonds, ionic bonds, etc.) between monomers and/or polymers of the polymeric separation medium, where the bonds (e.g., covalent bonds, ionic bonds, etc.) may be disrupted upon application of the applied stimulus. By "labile" is meant that the crosslinker decrosslinks upon application of the applied stimulus. For instance, a labile crosslinker may be a moiety that forms bonds (e.g., covalent bonds, ionic bonds, etc.) between monomers and/or polymers of the polymeric separation medium, where the bonds are disrupted upon application of the applied stimulus.

In certain embodiments, the labile crosslinker decrosslinks upon application of an applied stimulus. The applied stimulus may be an externally applied stimulus that is capable of disrupting the bonds (e.g., covalent bonds, ionic bonds, etc.) formed by the labile crosslinker. For example, the labile crosslinker may decrosslink upon application of an applied stimulus, such as, but not limited to an acid, a base, an oxidizing agent, a reducing agent, an affinity agent, heat, light (e.g., ultraviolet (UV) light), a solvent, combinations thereof, and the like. As such, the labile crosslinker may be an acid cleaved crosslinker, an alkaline cleaved crosslinker, an oxidation cleaved crosslinker, a reduction cleaved crosslinker, a molecular affinity crosslinker, a heat cleaved crosslinker, a photo cleaved crosslinker, or a solvent cleaved crosslinker, an ionic crosslinker, and the like. In some instances, the labile crosslinker includes one or more of ethylene glycol diacrylate (EDA), N,N'-(1,2-dihydroxyethylene)bisacrylamide (DHEBA), N—N'-diallyltartardiamide (DATD), N,N'-bis(acryloyl)cystamine (BAC), N,N'-(7,7-dimethyl-3,6,8,11-tetraoxatridecane-1,13-diyl)diacrylamide (DOK), N,N'-[(1-methylethylidene)bis(oxy-2,1-ethanediyl)]diacrylamide (DK), and alginate.

In some instances, the labile crosslinker is N,N'-(7,7-dimethyl-3,6,8,11-tetraoxatridecane-1,13-diyl)diacrylamide (DOK). As described above, a labile crosslinker decrosslinks when an applied stimulus is contacted with the labile crosslinker. For the DOK labile crosslinker, the applied stimulus is an acid, which performs acid hydrolysis of the DOK labile crosslinker. Acid hydrolysis of the ketal group of the DOK labile crosslinker is a rapid reaction at low pH values that results in an inert ketone product. The ketal group may be stable for days in neutral to basic buffers used for electrophoresis.

In some instances, the labile crosslinker is N,N'-[(1-methylethylidene)bis(oxy-2,1-ethanediyl)]diacrylamide (DK). For the DK labile crosslinker, the applied stimulus is an acid, which performs acid hydrolysis of the DK labile crosslinker.

Certain properties of labile crosslinkers are described in the table below.

In certain embodiments, the labile crosslinker is stable in the assay conditions used in the methods of the present disclosure (e.g., stable under the assay conditions before application of the applied stimulus that decrosslinks the labile crosslinker). For instance, the labile crosslinker may be substantially stable in cell and electrophoresis buffers, for example in buffers such as, but not limited to, phosphate buffered saline (PBS, pH 7.4) and tris-glycine (pH 8.4).

In certain embodiments, application of the applied stimulus decrosslinks the labile crosslinker without damaging analytes of interest in the sample being analyzed. For example, application of the applied stimulus may be sufficient to decrosslink the labile crosslinker without damaging protein-antibody epitopes. In certain embodiments, decrosslinking of the labile crosslinker is an irreversible reaction, such that the disrupted crosslinker does not re-crosslink the polymeric separation medium. In certain embodiments, the decrosslinked labile crosslinker produces a product from the decrosslinking reaction that is substantially non-reactive after decrosslinking. For instance, decrosslinking of the labile crosslinker may produce a reaction product that does not re-crosslink the polymeric separation medium or react with assay components or constituents of the sample being analyzed. In certain embodiments, the decrosslinking reaction may be performed in 5 hours or less, such as 4 hours or less, or 3 hours or less, or 2 hours or less, or 1 hour or less, or 45 minutes or less, or 30 minutes or less, or 15 minutes or less, or 10 minutes or less, or 5 minutes or less. In certain embodiments, the carbon chain length of the labile crosslinker is $C_{50}$ or less, such as $C_{40}$ or less, or $C_{30}$ or less, or $C_{25}$ or less, or $C_{20}$ or less, or $C_{15}$ or less, or $C_{12}$ or less, or $C_{10}$ or less, or $C_8$ or less, or $C_6$ or less, or $C_3$ or less. In some instances, a labile crosslinker with a shorter chain length as compared to the non-labile crosslinker may facilitate a maximization in the increase in average pore size of the

TABLE 1

Properties of labile acrylamide crosslinkers for gel solubilization.

| Name | Dissolution Treatment (Applied Stimulus) | Reaction | Dissolution Kinetics | Solubility (mol/L) [+] | Irreversible | Non-Reactive Product | Chain Length | Molecular Weight |
|---|---|---|---|---|---|---|---|---|
| N,N'-(1,2-dihydroxyethylene)bisacrylamide (DHEBA) | Periodic Acid | Periodate oxidation | Hours | 0.14 | Yes | Yes | 10 | 200.19 |
| N,N'-(diallyltartardiamide) (DATD) | Periodic Acid | Periodate oxidation | Hours | 0.26 | Yes | Yes | 12 | 228.25 |
| N,N'-bisacrylylcystamine (BAC) | Reducing Agent | Disulfide cleavage | Minutes | 0.017 | No | No | 14 | 260.38 |
| Ethylene glycol diacrylate (EDA) | Base | Basic ester hydrolysis | Minutes | 0.072 | Yes | No | 10 | 170.16 |
| N,N'-(7,7-dimethyl-3,6,8,11-tetraoxatridecane-1,13-diyl)diacrylamide (DOK) | Acid | Acidic acetyl hydrolysis | Minutes | 0.073 | Yes | Yes | 21 | 358.43 |
| N,N'-[(1-methylethylidene)bis(oxy-2,1-ethanediyl)]diacrylamide (DK) | Acid | Acidic acetyl hydrolysis | Minutes | 0.042 | Yes | Yes | 15 | 270.32 |

[+] Note:
Solubility was computationally estimated (Advanced Chemistry Development, Inc.).

polymeric separation medium upon application of the applied stimulus for the decrosslinking reaction.

In certain embodiments, the polymeric separation medium includes the labile crosslinker and the non-labile crosslinker such that the molar ratio of the labile crosslinker to total crosslinker (e.g., non-labile and labile crosslinker) ranges from 0.75 to 0.99, or from 0.80 to 0.99, or from 0.85 to 0.99, or from 0.90 to 0.99, or from 0.95 to 0.99, or from 0.97 to 0.99. In certain embodiments, the molar ratio of the labile crosslinker to total crosslinker is from 90 to 0.99.

In certain embodiments, the polymeric separation medium includes a labile crosslinker and a non-labile crosslinker such that the molar ratio of the labile crosslinker to total crosslinker (e.g., the molar ratio of the labile crosslinker to the total of the non-labile and the labile crosslinker) ranges from 0.25 to 1, or from 0.3 to 1, or from 0.35 to 1, or from 0.4 to 1, or from 0.45 to 1, or from 0.5 to 1, or from 0.55 to 1, or from 0.6 to 1, or from 0.65 to 1, or from 0.7 to 1, or from 0.75 to 1, or from 0.8 to 1, or from 0.85 to 1, or from 0.9 to 1, or from 0.95 to 1, or from 0.97 to 1, or from 0.98 to 1, or from 0.99 to 1. In certain embodiments, the molar ratio of the labile crosslinker to total crosslinker is from 0.5 to 1. In certain embodiments, the molar ratio of the labile crosslinker to total crosslinker is from 0.90 to 0.99. In some cases, the molar ratio of the labile crosslinker to total crosslinker is 0.9. In some cases, the molar ratio of the labile crosslinker to total crosslinker is 0.95. In some cases, the molar ratio of the labile crosslinker to total crosslinker is 1.

In certain embodiments, the polymeric separation medium includes a dissolvable polymer. A dissolvable polymer may include one or more components that dissolve upon application of an applied stimulus. For example, a dissolvable polymer may dissolve (e.g., decrease in structural integrity) upon application of an applied stimulus, such as, but not limited to heat, an acid, a base, a solvent, etc. In some embodiments, the dissolvable polymer may dissolve (e.g., decrease in structural integrity) upon application of heat (e.g., upon an increase in temperature of the polymeric separation medium). In some instances, the dissolvable polymer includes a thermoplastic polymer. By "thermoplastic" is meant that the polymer has a decreased structural integrity as the temperature increases. A decrease in structural integrity of the thermoplastic polymer may produce an increase in the average pore size of the polymeric separation medium. In some instances, a thermoplastic polymer is configured to dissolve when contacted with a heated solution (e.g., a solution with a temperature at or above a certain temperature, such as above the initial temperature of the polymeric separation medium, or above a temperature at which the thermoplastic polymer dissolves). In certain embodiments, the thermoplastic polymer is an agarose gel. In these embodiments, the applied stimulus may be heat, such as a heated solution (e.g., a solution with a temperature at or above a temperature where the thermoplastic polymer dissolves). In certain instances, the thermoplastic polymer has a temperature where the thermoplastic polymer dissolves of 50° C. or more, such as 55° C. or more, or 60° C. or more, or 65° C. or more, or 70° C. or more, or 75° C. or more, or 80° C. or more, or 85° C. or more, or 90° C. or more, or 95° C. or more. In some cases, the thermoplastic polymer has a temperature where the thermoplastic polymer dissolves of 80° C. or more.

In some instances, the dissolvable polymer includes a thermoset polymer. A thermoset polymer is a polymer that polymerizes (e.g., to form a polymeric separation medium) and substantially retains its structural integrity. For example, after polymerization, a thermoset polymer may substantially retain its structural integrity even if an applied stimulus is applied to the thermoset polymer. In some cases, a thermoset polymer substantially retains its structural integrity (e.g., does not significantly dissolve) as the temperature increases. In some embodiments, a thermoset polymer substantially retains its structural integrity (e.g., does not significantly dissolve) even when contacted with a heated solution (e.g., a solution with a temperature at or above a certain temperature, such above the initial temperature of the polymeric separation medium). In certain cases, the thermoset polymer is a polyacrylamide polymer, such as a polyacrylamide gel polymer.

In some instances, the dissolvable polymer includes a thermoplastic polymer as described herein and a thermoset polymer as described herein. In certain embodiments, the thermoplastic polymer is an agarose gel. In some cases, the thermoplastic polymer (e.g., agarose gel) is present in the polymeric separation medium in an amount of 10% or less, such as 7% or less, or 5% or less, or 4% or less, or 3% or less, or 2% or less, or 1% or less. In certain cases, the thermoset polymer is a polyacrylamide polymer, such as a polyacrylamide polymer formed from acrylamide and bisacrylamide monomers. In certain instances, the total acrylamide content of the thermoset polymer (e.g., polyacrylamide polymer), % T, (T=total concentration of acrylamide and bisacrylamide monomer), ranges from 1% to 20%, or from 1% to 15%, or from 1% to 10%. In some cases, the % T is 6%. In certain embodiments, the thermoset polymer (e.g., polyacrylamide polymer) has a crosslinker content, % C, ranging from 1% to 10%, or from 1% to 9%, such as from 1% to 8%, including from 1% to 7%, or from 1% to 6%, or from 1% to 5%, or from 1% to 4%, or from 1% to 3%, or from 1% to 2%. In certain embodiments, the crosslinker content is about 3% (e.g., 3.3%).

In certain embodiments, the polymeric separation medium includes a swellable polymer. By swellable is meant that the polymeric separation medium has an initial average pore size, and upon application of an applied stimulus to the swellable polymer, the average pore size increases from the initial average pore size. In these embodiments, the applied stimulus may be heat, light or a solvent (e.g., a solvent that causes the swellable polymer to increase in pore size).

In certain embodiments, the polymeric separation medium is configured to immobilize one or more of the constituents of interest in the polymeric separation medium. For example, the polymeric separation medium may include functional groups that covalently bond to one or more of the constituents of interest in the polymeric separation medium. For instance, the functional groups may be light-activated functional groups (e.g., UV light activated). Activation of the functional groups may form covalent bonds to constituents of the sample being analyzed, such as analytes of interest in the sample that have been separated in the polymeric separation medium. In some cases, immobilization of separated constituents of interest in the polymeric separation medium facilitates subsequent detection of the separated constituents of interest. Embodiments of these types of polymeric separation media are described in more detail in the sections below.

In certain embodiments, the device is a microfluidic device. A "microfluidic device" is device that is configured to control and manipulate fluids geometrically constrained to a small scale (e.g., sub-millimeter). Other embodiments of the devices described herein may be configured to perform an assay on a larger scale, such as, but not limited to, devices having millimeter-scale dimensions or centimeter-scale dimensions. Embodiments of the microfluidic device include a separation medium as described herein. The separation medium may be configured to separate constituents in a sample from each other. The separation medium may be configured to immobilize one or more constituents of interest in the polymeric separation medium and have an increased pore size upon application of an applied stimulus, as described herein. The separated constituents may then be detected. Additional details about the separation medium are discussed below.

Separation Medium

In certain embodiments, the microfluidic device includes a separation medium. The separation medium may be configured to separate constituents of a sample from each other. In some cases, the separation medium is configured to separate constituents in a sample based on the physical properties of the constituents. For example, the separation medium may be configured to separate the constituents in the sample based on the molecular mass, size, charge (e.g., charge to mass ratio), isoelectric point, etc. of the constituents.

In certain instances, the separation medium is configured to separate the constituents in the sample based on the size and charge of the constituents. The separation medium may be configured to separate the constituents in the sample into distinct detectable bands of constituents. By "band" is meant a distinct detectable region where the concentration of a constituent is significantly higher than the surrounding regions. Each band of constituent may include a single constituent or several constituents, where each constituent in a single band of constituents has substantially similar physical properties, as described above.

In certain embodiments, the separation medium is configured to separate the constituents in a sample as the sample traverses the separation medium. In some cases, the separation medium is configured to separate the constituents in the sample as the sample flows through the separation medium. Aspects of the separation medium include that the separation medium has a directional axis. In some instances, the directional axis is oriented in the direction the sample travels as the sample traverses the separation medium. In some embodiments, the directional axis of the separation medium is aligned with the length of the separation medium. In these embodiments, the sample traverses the separation medium along the length of the separation medium. In some cases, the length of the separation medium is greater than the width of the separation medium, such as 2 times, 3 times, 4 times, 5 times, 10 times, 25 times, 50 times, 75 times, 100 times, 125 times, 150 times, 175 times, or 200 times or more the width of the separation medium.

In certain embodiments, the separation medium includes a polymer, such as a polymeric gel. The polymeric gel may be a gel suitable for gel electrophoresis. The polymeric gel may include, but is not limited to, a polyacrylamide gel (e.g., methacrylamide gel), an agarose gel, and the like. The resolution of the separation medium may depend on various factors, such as, but not limited to, pore size, total polymer content (e.g., total acrylamide content), concentration of crosslinker, applied electric field, assay time, and the like. For instance, the resolution of the separation medium may depend on the pore size of the separation medium. In some cases, the pore size depends on the total polymer content of the separation medium and/or the concentration of crosslinker in the separation medium. In certain instances, the separation medium is configured to resolve analytes with molecular mass differences of 100,000 Da or less, or 75,000 Da or less, or 50,000 Da or less, or 25,000 Da or less, or 10,000 Da or less, such as 7,000 Da or less, including 5,000 Da or less, or 2,000 Da or less, or 1,000 Da or less, for example 500 Da or less, or 100 Da or less. In some cases, the separation medium may include a polyacrylamide gel that has a total acrylamide content, T (T=Φtal concentration of acrylamide and bisacrylamide monomer), ranging from 1% to 50%, or from 1% to 40%, or from 1% to 30%, such as from 1% to 25%, including from 1% to 20%, or from 1% to 15%, or from 1% to 10%, or from 1% to 5%.

In certain embodiments, the separation medium is configured to be formed from precursor moieties. For example, the separation medium may be a gel (e.g., a polyacrylamide gel) formed form gel precursors (e.g., polyacrylamide gel precursors, such as polyacrylamide gel monomers). The precursor moieties may be configured to react to form the separation medium. For instance, the gel precursors may be configured to react with each other to form the polyacrylamide gel separation medium. The reaction between the gel precursors may be activated by any suitable protocol, such as, but not limited to, chemical activation, light activation, etc. In some embodiments, the gel precursors are configured to be activated chemically, for example by contacting the gel precursors with an activation agent, such as, but not limited to, a peroxide. In some embodiments, the gel precursors are configured to be activated by light (i.e., photo-activated), for instance by contacting the gel precursors with light. The light may be of any wavelength suitable for activating the formation of the separation medium, and in some instances may have a wavelength associated with blue light in the visible spectrum. For example, the light used to activate formation of the separation medium may have a wavelength ranging from 400 nm to 500 nm, such as from 410 nm to 490 nm, including from 420 nm to 480 nm, or from 430 nm to 480 nm, or from 440 nm to 480 nm, or from 450 nm to 480 nm, or from 460 nm to 480 nm, or from 465 nm to 475 nm. In certain cases, the light used to activate formation of the separation medium has a wavelength ranging from 465 to 475 nm. In some instances, the light used to activate formation of the separation medium has a wavelength of 470 nm.

In certain embodiments, the separation medium includes a buffer. The buffer may be any convenient buffer used for gel electrophoresis. In certain embodiments, the buffer is a Tris buffer. In certain embodiments, the separation medium includes a buffer, such as a Tris-glycine buffer. For example, the buffer may include a mixture of Tris and glycine.

In some cases, the buffer includes a detergent. In certain instances, the detergent is configured to provide analytes in the sample with substantially similar charge-to-mass ratios. Analytes with substantially similar charge-to-mass ratios may facilitate the separation of the analytes into one or more bands in the separation medium based on the molecular masses of the analytes in the sample. In certain cases, the detergent is anionic detergent configured to provide analytes in the sample with a charge, such as a negative charge. For example, the detergent may be an anionic detergent, such as, but not limited to, sodium dodecyl sulfate (SDS).

In certain embodiments, the separation medium is configured to separate the constituents in the sample based on the isoelectric point (pI) of the constituents (e.g., isoelectric focusing, IEF). In some cases, the separation medium includes a polymeric gel as described above. For example, the polymeric gel may include a polyacrylamide gel, an agarose gel, and the like. In certain instances, the polymeric gel includes a pH gradient, which, in some embodiments, is co-polymerized with the polymeric gel. In embodiments where the pH gradient is co-polymerized with the polymeric gel, the pH gradient may be substantially immobilized resulting in a separation medium having an immobilized pH gradient. In certain instances, the pH gradient includes a weak acid or a weak base (e.g., Immobilines), ampholytes, or the like.

In certain embodiments, the separation medium includes a buffer. The buffer may be any convenient buffer suitable for isoelectric focusing. In some instances, the buffer is a catholyte buffer, such as, but not limited to a sodium hydroxide buffer. In some instances, the buffer is an anolyte buffer, such as but not limited to, a phosphoric acid buffer. In certain embodiments, the separation medium in the first separation region includes a fluid-phase pH gradient. As such, in some instances, the separation medium in the first separation region (e.g., the isoelectric focusing region) includes a polybuffer, an ampholyte solution or an electrode-generated pH gradient. Additional aspects of devices configured for isoelectric focusing are described in WO 2012/177940, the disclosure of which is incorporated herein by reference.

In certain embodiments, the separation medium is configured to separate constituents in a sample based on size. For example, in some cases, the separation medium includes a polymeric gel having a pore size gradient. The pore size gradient may decrease along the directional axis of the separation medium. For example, the pore size gradient may have a pore size that decreases along the directional axis of the separation medium, such that a sample traversing the separation medium encounters progressively smaller and smaller pore sizes in the separation medium. As constituents in the sample traverse the pore size gradient, the constituents in the sample may be separated based on size. For example, larger constituents in the sample may be retained in the separation medium more readily than smaller constituents, which are able to traverse greater distances through the decreasing pore size gradient.

In certain embodiments, the separation medium is configured to separate the constituents in the sample based on size (e.g., molecular size). For example, the separation medium may be configured to separate constituents in a sample by pore limit electrophoresis (PLE). In some cases, the separation medium is a polymeric separation medium that includes a polymeric gel having a pore size gradient. In embodiments of the pore size gradient, the pore size of the polymeric separation medium may decrease along the directional axis of the separation medium. For example, the pore size gradient may have a pore size that decreases along the directional axis of the separation medium, such that a sample traversing the separation medium encounters progressively smaller and smaller pore sizes in the separation medium. As constituents in the sample traverse the pore size gradient, the constituents in the sample may be separated based on size. For example, larger constituents (e.g., constituents that have a larger molecular size) may be retained in the separation medium more readily than smaller constituents, which are able to traverse greater distances through the decreasing pore size gradient. Additional aspects of devices configured for pore limit electrophoresis are described in WO 2011/142781, the disclosure of which is incorporated herein by reference.

Other types of separations based on molecular size are also provided. For instance, in certain embodiments, the separation medium may be configured to separate constituents under native conditions, such that the mobility of sample constituents depends on the molecular size of the constituents. In some cases, the separation medium is a polymeric separation medium that includes a polymeric gel. In certain embodiments, the pore size of the polymeric separation medium may be substantially uniform along the directional axis of the separation medium. In some instances, separation under native conditions does not include a denaturant in the electrophoresis buffer. As constituents in the sample traverse the separation medium, the constituents in the sample may be separated based on molecular size (e.g., cross-sectional area). For example, constituents with different molecular sizes may experience different electrophoretic forces depending on the shape of their overall structure, and thus have differing mobilities through the polymeric separation medium.

In certain embodiments, the separation medium is configured to separate the constituents in the sample based on charge (e.g., charge to mass ratio). For example, the separation medium may be configured to separate constituents under denaturing conditions, such that the mobility of sample constituents depends on the linear length and the charge to mass ratio. In some cases, the separation medium is a polymeric separation medium that includes a polymeric gel. In certain embodiments, the pore size of the polymeric separation medium may be substantially uniform along the directional axis of the separation medium. In some instances, a denaturant may be included, such as sodium dodecyl sulfate (SDS), which is an anionic detergent that imparts a substantially even distribution of negative charge per unit mass. As constituents in the sample traverse the separation medium, the constituents in the sample may be separated based on charge to mass ratio. For example, larger constituents (e.g., constituents that have a greater charge) may be retained in the separation medium more readily than smaller constituents, which have less charge.

In certain embodiments, the separation medium is configured to immobilize the constituents of interest in the separation medium. The separation medium may be configured to immobilize the separated sample components in the separation medium. For example, the separation medium may be configured to covalently bond to the constituents of interest (e.g., separated sample components). The covalent bond may be formed upon application of an immobilization stimulus. For example, the immobilization stimulus may include electromagnetic radiation, such as light. In some cases, the light is ultraviolet (UV) light. In some instances, the light used to covalently bond the constituents of interest to the separation medium has a wavelength ranging from 10 nm to 400 nm, such as from 50 nm to 400 nm, including from 100 nm to 400 nm, or from 150 nm to 400 nm, or from 200 nm to 400 nm, or from 250 nm to 400 nm, or from 300 nm to 400 nm, or form 325 nm to 375 nm, or from 350 nm to 365 nm. In certain cases, the light has a wavelength ranging from 350 to 365 nm. In some instances, the light has a wavelength of 365 nm. In other embodiments, the immobilization stimulus may be a chemical stimulus. For example, a covalent bond may be formed between the constituents of interest (e.g., separated sample components) and the separation medium upon contact with a chemical stimulus, such as, but not limited to, formaldehyde.

In certain embodiments, the light used to covalently bond the constituents of interest to the separation medium has a wavelength different from the light used to activate formation of the separation medium. For example, as described above, the light used to activate formation of the separation medium may have a wavelength of blue light in the visible spectrum. As described above, the light used to covalently bond the constituents of interest to the separation medium may have a wavelength of UV light. As such, in certain embodiments, the separation medium is configured to be formed upon application of a first wavelength of light, and configured to covalently bond the constituents of interest upon application of a second wavelength of light. The first and second wavelengths of light may be blue light and UV light, respectively, as described above.

In some cases, the separation medium includes functional groups that covalently bond to the one or more constituents of interest. For example, the constituents of interest may be an analyte of interest, such as, but not limited to, a protein, a peptide, and the like. The functional groups may include functional groups that are activated upon application of an applied stimulus, such as electromagnetic radiation (e.g., light), or a chemical stimulus (e.g., formaldehyde), as described above. As such, in certain instances, the functional groups are chemically-activatable functional groups. In other instances, the functional groups are light-activatable functional groups. For example, upon application of light, the light-activatable functional groups may form a reactive species capable of forming covalent bonds, such as a radical alkyl intermediate. Examples of functional groups that may covalently bond to the constituents of interest upon application of an applied stimulus (e.g., light) include, but are not limited to, benzophenone groups, and the like. Once activated by the applied stimulus, the functional group may bond to the constituent of interest (e.g., protein or peptide) forming a covalent bond between the separation medium and the constituent of interest. For example, the functional group may form a carbon-carbon bond between the functional group and the constituent of interest.

In some embodiments, the functional groups are co-polymerized with the separation medium. For example, the functional groups may include a linker group that is attached to the separation medium. The functional group may be bound to the linker group at a first end of the linker group, and a second end of the linker group may be bound to the separation medium, thereby indirectly bonding the functional group to the separation medium. In some instances, the second end of the linker group, which is bound to the separation medium, includes a co-monomer, such as, but not limited to, an acrylamide co-monomer, and the like. In some embodiments, the second end of the linker group includes a methacrylamide co-monomer. In certain cases, the functional group is a benzophenone functional group and the linker group includes a co-monomer, such as an acrylamide co-monomer. For example, the functional group (including the linker group) may be N-(3-[(4-benzoylphenyl)formamido]propyl) methacrylamide (also known as BPMA or BPMAC) or 3-benzoyl-N-[3-(2-methyl-acryloylamino)-propyl]-benzamide (BP-APMA); the structures of each of which are shown below. As described above, the linker group may have the functional group attached at a first end, and the second end of the linker group bound to the polymeric medium. In some instances, the linker group includes a spacer group, such as a spacer group between the first end and the second end of the linker group (e.g., as pacer group in the middle portion of the linker group between the functional group and the co-monomer). In some cases, the spacer group of the linker group between the first and second ends of the linker group includes an aliphatic group, such as, but not limited to, a $C_{1-10}$ alkyl group. In certain cases, the spacer group of the linker group includes a lower alkyl group (e.g., a $C_{1-6}$ alkyl group, or a $C_{1-5}$ alkyl group, or a $C_{1-4}$ alkyl group, or a $C_{1-3}$ alkyl group, or a $C_{1-2}$ alkyl group). For instance, the spacer group of the linker group may include a propyl group.

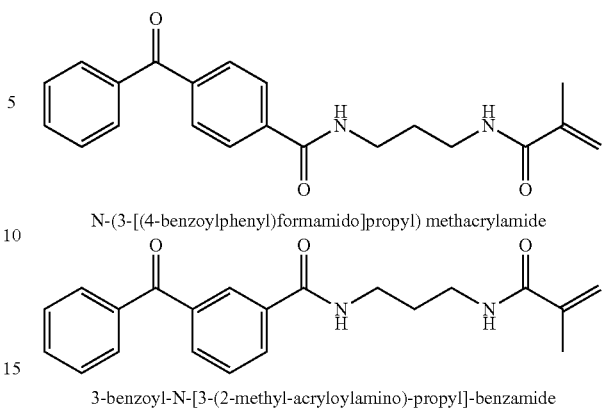

N-(3-[(4-benzoylphenyl)formamido]propyl) methacrylamide 3-benzoyl-N-[3-(2-methyl-acryloylamino)-propyl]-benzamide In certain embodiments, the separation medium is configured to bind to constituents in a sample at a minimum capture efficiency. The capture efficiency is the percentage of constituents in the sample that are bound by the separation medium. In some instances, the capture efficiency, q, is the ratio of fluorescence measured after gradient washout ($AFU_w$) to the fluorescence during focusing ($AFU_f$), corrected by a factor, ε ε, to account for the anticipated influence of pH on the species fluorescence signal. In certain embodiments, the separation medium is configured to have a capture efficiency of 1% or more, such as 5% or more, including 10% or more, or 20% or more, or 30% or more, or 40% or more, or 50% or more, or 60% or more, or 70% or more, or 80% or more, or 90% or more, or 95% or more. In some instances, the separation medium has a capture efficiency of 75% or more. In some instances, the separation medium has a capture efficiency of 90% or more. In some instances, the separation medium has a capture efficiency of 95% or more.

Further Aspects of Embodiments of the Devices

Aspects of the devices include embodiments where the device is configured to subject a sample to a flow field. By "flow field" is meant a region where components traverse the region in substantially the same direction. For example, a flow field may include a region where mobile components move through a medium in substantially the same direction. A flow field may include a medium, such as a separation medium, a loading medium, etc., where components, such as buffers, analytes, reagents, etc., move through the medium in substantially the same direction. A flow field may be induced by an applied electric field, a pressure differential, electroosmosis, and the like. In some embodiments, flow field may be directionally distinct. For example, the flow field may be aligned with the directional axis of the separation medium. The flow field may be configured to direct the sample or constituents (e.g., analytes) through the elongated flow path containing the separation medium.

In certain embodiments, the device is configured to subject a sample to an electric field. The electric field may facilitate the movement of the sample through the device (e.g., electrokinetic transfer of the sample from one region of the device to another region of the device). The electric field may also facilitate the separation of the analytes in the sample by electrophoresis (e.g., polyacrylamide gel electrophoresis (PAGE), SDS-PAGE, isoelectric focusing, etc.), as described above.

For instance, the electric field may be configured to direct the analytes in a sample through the separation medium of the device. The electric field may be configured to facilitate the separation of the analytes in a sample based on the physical properties of the analytes. For example, the electric field may be configured to facilitate the separation of the analytes in the sample based on the molecular mass, size, charge (e.g., charge to mass ratio), isoelectric point, etc. of the analytes. In certain instances, the electric field is configured to facilitate the separation of the analytes in the sample based on the molecular mass of the analytes. In other embodiments, the electric field is configured to facilitate separation of the analytes in the sample based on the isoelectric point (pI) of the analytes.

In some embodiments, the electric field may be directionally distinct. For example, the electric field may be aligned with the directional axis of the separation medium. The electric field may be configured to direct the sample or analytes through the separation medium along the directional axis of the separation medium.

In certain embodiments, the device includes one or more electric field generators configured to generate an electric field. The electric field generator may be configured to apply an electric field to various regions of the device, such as one or more of the separation medium, the loading medium, and the like. The electric field generators may be configured to electrokinetically transport the analytes and components in a sample through the various media in the device. In certain instances, the electric field generators may be proximal to the device, such as arranged on the device. In some cases, the electric field generators are positioned a distance away from the device. For example, the electric field generators may be incorporated into a system for use with the device, as described in more detail below.

Embodiments of the device may be made of any suitable material that is compatible with the assay conditions, samples, buffers, reagents, etc. used in the device. In some cases, the device is made of a material that is substantially inert (e.g., does not degrade or react) with respect to the samples, buffers, reagents, etc. used in the subject device and methods. For instance, the device may be made of materials, such as, but not limited to, glass, quartz, polymers, elastomers, paper, combinations thereof, and the like.

In some instances, the device includes one or more sample input ports. The sample input port may be configured to allow a sample to be introduced into the device. The sample input port may be in fluid communication with the separation medium. In some instances, the sample input port is in fluid communication with the upstream end of the separation medium. The sample input port may further include a structure configured to prevent fluid from exiting the sample input port. For example, the sample input port may include a cap, valve, seal, etc. that may be, for instance, punctured or opened to allow the introduction of a sample into the device, and then re-sealed or closed to substantially prevent fluid, including the sample and/or buffer, from exiting the sample input port.

In certain embodiments, the device is substantially transparent. By "transparent" is meant that a substance allows visible light to pass through the substance. In some embodiments, a transparent device facilitates application of an applied stimulus (e.g., electromagnetic radiation, such as light, including visible light, UV light, etc.) to the separation medium. In certain cases, a transparent device facilitates detection of analytes bound to the separation medium, for example analytes that include a detectable label, such as a fluorescent label.

In certain embodiments, the separation medium is an elongated separation medium. By elongated is meant that the separation medium has a length that is greater than its width, such as a length that is 2 times, 3 times, 4 times, 5 times, 10 times, 20 times, 50 times, 100 times, etc. its width. In some instances, the length of the separation medium is the dimension of the separation medium that corresponds to the directional axis of the separation medium (e.g., the axis along which the sample constituents are separated during an assay). In certain instances, the separation medium has a length from 1 mm to 15 mm, such as 1 mm to 14 mm, or 1 mm to 13 mm, or 1 mm to 12 mm, or 1 mm to 11 mm, or 1 mm to 10 mm, or 1 mm to 9 mm, or 1 mm to 8 mm, or 1 mm to 7 mm, or 1 mm to 6 mm, or 1 mm to 5 mm, or 1 mm to 4 mm, or 1 mm to 3 mm, or 1 mm to 2 mm. In certain embodiments, the separation medium has a width from 0.5 mm to 10 mm, such as 0.5 mm to 9 mm, or 0.5 mm to 8 mm, or 0.5 mm to 7 mm, or 0.5 mm to 6 mm, or 0.5 mm to 5 mm, or 0.5 mm to 4 mm, or 0.5 mm to 3 mm, or 0.5 mm to 2 mm, or 0.5 to 1 mm. In certain embodiments, the separation medium has a thickness from 0.5 mm to 20 mm, or 0.5 mm to 15 mm, or 0.5 mm to 10 mm, such as from 0.5 mm to 9 mm, or 0.5 mm to 8 mm, or 0.5 mm to 7 mm, or 0.5 mm to 6 mm, or 0.5 mm to 5 mm, or 0.5 mm to 4 mm, or 0.5 mm to 3 mm, or 0.5 mm to 2 mm, or 0.5 mm to 1 mm.

In certain embodiments, the separation medium is disposed on a solid support. In certain embodiments, the solid support is sized to accommodate the separation medium. For example the solid support may have dimensions (e.g., length and width) such that the entire separation medium is supported by the solid support. In some cases, the solid support may have dimensions (e.g., length and width) larger than the separation medium. In some instances, the solid support has dimensions in the range of 10 mm×10 mm to 200 mm×200 mm, including dimensions of 100 mm×100 mm or less, such as 50 mm×50 mm or less, for instance 25 mm×25 mm or less, or 10 mm×10 mm or less, or 5 mm×5 mm or less, or 3 mm×3 mm or less, for instance, 1 mm×1 mm or less. In some cases, the solid support has a thickness ranging from 0.5 mm to 5 mm, or 1 mm to 4 mm, of 1 mm to 3 mm, or 1 mm to 2 mm. In certain instances, the solid support has a thickness of 1 mm.

In certain embodiments, the device has a width ranging from 1 mm to 10 cm, such as from 5 mm to 5 cm, including from 5 mm to 1 cm. In some instances, the device has a length ranging from 1 mm to 100 cm, such as from 1 mm to 50 cm, including from 5 mm to 10 cm, or from 5 mm to 1 cm. In certain aspects, the device has an area of 1000 $cm^2$ or less, such as 100 $cm^2$ or less, including 50 $cm^2$ or less, for example, 10 $cm^2$ or less, or 5 $cm^2$ or less, or 3 $cm^2$ or less, or 1 $cm^2$ or less, or 0.5 $cm^2$ or less, or 0.25 $cm^2$ or less, or 0.1 $cm^2$ or less.

Further aspects related to devices, separation media for devices, and methods for using devices are found in U.S. application Ser. No. 13/055,679, filed Jan. 24, 2011, and U.S. application Ser. No. 13/071,057, filed Jun. 21, 2012, the disclosures of each of which are incorporated herein by reference in their entirety.

Methods

Embodiments of the methods are directed to detecting an analyte in a fluid sample. In certain embodiments of the methods, one or more constituents in the sample may be separated. To separate constituents in the sample, the method includes introducing a fluid sample into a device of the present disclosure. Introducing the fluid sample into the device may include contacting the sample with the separation medium of the device. The method further includes separating the sample constituents in the separation medium to produce a separated sample (e.g., separated sample constituents or separated sample components). In some cases, the separated sample is produced by gel electrophoresis as the sample traverses the separation medium. For example, the method may include applying an electric field across the polymeric separation medium in a manner sufficient to produce separated sample components in the polymeric separation medium. The separated sample may include distinct detectable bands of constituents (e.g., analytes), where each band includes one or more constituents that have substantially similar properties, such as molecular mass, size, charge (e.g., charge to mass ratio), isoelectric point, etc. depending on the type of separation performed.

In certain embodiments, the method includes immobilizing the separated sample components in the polymeric separation medium. For example, after the constituents in the sample have been separated, the method may include applying an immobilization stimulus to the separation medium to covalently bond the constituents to the separation medium. In some cases, applying the immobilization stimulus includes applying electromagnetic radiation to the separation medium. For instance, the method may include exposing the separation medium to light, such as, but not limited to, visible light, UV light, infrared light, etc. In certain cases, the method includes applying light (e.g., UV light) to the separation medium to covalently bond the constituents to the separation medium. In other embodiments, applying the immobilization stimulus includes contacting the separation medium with a chemical stimulus (e.g., formaldehyde).

In certain embodiments, the light used to covalently bond the constituents of interest to the separation medium has a wavelength different from the light used to activate formation of the separation medium. For example, as described herein, the light used to activate formation of the separation medium may have a wavelength of blue light in the visible spectrum. As described above, the light used to covalently bond the constituents of interest to the separation medium may have a wavelength of UV light. As such, in certain embodiments, the method includes exposing the separation medium to a first wavelength of light to form the separation medium, and exposing the separation medium to a second wavelength of light to covalently bond the constituents of interest to the separation medium. The first and second wavelengths of light may be blue light and UV light, respectively, as described herein.

As described herein, embodiments of the polymeric separation medium are configured to immobilize one or more constituents of interest in the polymeric separation medium and have an increased pore size upon application of an applied stimulus (e.g., a stimulus that is applied to the polymeric separation medium to produce a polymeric separation medium with an increased average pore size as compared to the average pore size of the polymeric separation medium before application of the applied stimulus). In certain embodiments, the method includes contacting the polymeric separation medium with the applied stimulus. In some instances, the applied stimulus is an acid, a base, an oxidizing agent, a reducing agent, an affinity agent, heat, light, or a solvent. As described herein, application of the applied stimulus to the polymeric separation medium produces a polymeric separation medium with an increased average pore size. A polymeric separation medium with an increased average pore size may facilitate subsequent detection of the immobilized constituents of interest in the polymeric separation medium.

In certain embodiments, the method includes determining whether an analyte of interest is present in a sample, e.g., determining the presence or absence of one or more analytes of interest in a sample. In some instances, the device is configured to detect the presence of one or more analytes in a sample. In certain embodiments of the methods, the presence of one or more analytes in the sample may be determined qualitatively or quantitatively. Qualitative determination includes determinations in which a simple yes/no result with respect to the presence of an analyte in the sample is provided to a user. Quantitative determination includes both semi-quantitative determinations in which a rough scale result, e.g., low, medium, high, is provided to a user regarding the amount of analyte in the sample and fine scale results in which a measurement of the concentration of the analyte is provided to the user.

In certain embodiments, the method includes detecting an analyte of interest bound to the separation medium. Detectable binding of an analyte of interest to the separation medium indicates the presence of the analyte of interest in the sample. In some instances, detecting the analyte of interest includes contacting the analyte of interest with a label configured to specifically bind to the analyte of interest. The label can be any molecule that specifically binds to a protein or nucleic acid sequence or biomacromolecule that is being targeted (e.g., the analyte of interest). Depending on the nature of the analyte, the label can be, but is not limited to: single strands of DNA complementary to a unique region of the target DNA or RNA sequence for the detection of nucleic acids; antibodies against an epitope of a peptidic analyte for the detection of proteins and peptides; or any recognition molecule, such as a member of a specific binding pair. For example, suitable specific binding pairs include, but are not limited to: a member of a receptor/ligand pair; a ligand-binding portion of a receptor; a member of an antibody/antigen pair; an antigen-binding fragment of an antibody; a hapten; a member of a lectin/carbohydrate pair; a member of an enzyme/substrate pair; biotin/avidin; biotin/streptavidin; digoxin/antidigoxin; a member of a DNA or RNA aptamer binding pair; a member of a peptide aptamer binding pair; and the like. In certain embodiments, the label includes an antibody. The antibody may specifically bind to the analyte of interest.

In certain embodiments, the label includes a detectable label. Detectable labels include any convenient label that may be detected using the methods and systems, and may include, but are not limited to, fluorescent labels, colorimetric labels, chemiluminescent labels, multicolor reagents, enzyme-linked reagents, avidin-streptavidin associated detection reagents, radiolabels, gold particles, magnetic labels, and the like. In certain embodiments, the label includes an antibody associated with a detectable label. For example, the label may include a labeled antibody (e.g., a fluorescently labeled antibody) that specifically binds to the analyte of interest. As such, the method may include detecting the labeled analyte of interest.

As described above, detecting the analyte of interest includes contacting the analyte of interest with a label configured to specifically bind to the analyte of interest (e.g., an antibody that specifically binds to the analyte of interest). For example, detecting the analyte of interest may include contacting the analyte of interest with a primary label that specifically binds to the analyte of interest. In certain embodiments, the method includes enhancing the detectable signal from the labeled analyte of interest. For instance, enhancing the detectable signal from the labeled analyte of interest may include contacting the primary label with a secondary label configured to specifically bind to the primary label. In certain instances, the primary label is a primary antibody that specifically binds to the analyte of interest, and the secondary label is a secondary antibody that specifically binds to the primary antibody. As such, enhancing the detectable signal from the labeled analyte of interest may include contacting the primary antibody with a secondary antibody configured to specifically bind to the primary antibody. The use of two or more detectable labels as described above may facilitate the detection of the analyte of interest by improving the signal-to-noise ratio.

In certain embodiments, the method includes convective reagent delivery. As described above, separated constituents of a sample may be immobilized in the polymeric separation medium. As such, an external force may be used to facilitate more rapid delivery of reagents (e.g., detection reagents, such as labeled antibodies as described herein) to the immobilized constituents of interest. Examples of external forces to deliver reagents (e.g., detection reagents, such as labeled antibodies as described herein) include, but are not limited to, electrophoretic, hydrodynamic, magnetic, and dielectrophoretic forces.

In certain embodiments, the separated sample may be contacted with one or more secondary reagents. In some instances, the separated sample is contacted with the secondary reagent while the separated sample is still within the separation medium. The secondary reagent may be configured to allow additional analysis of the separated sample to be performed by the user. For instance, the one or more secondary reagents may include, but are not limited to, an affinity probe, a dye, an antibody, an enzyme, an enzyme substrate and a nucleic acid. In certain embodiments, the secondary reagent is contacted with the separated sample by diffusion. For example, the secondary reagent may be applied to a surface of the separation medium and allowed to passively diffuse through the separation medium to the separated sample constituents. In certain embodiments, the secondary reagent is contacted with the separated sample using active transport methods, such as electrokinetic transport or hydrodynamic transport.

In certain embodiments, the analyte detection reagent may not specifically bind to an analyte of interest. In some cases, the analyte detection reagent may be configured to produce a detectable signal from the analyte of interest without specifically binding to the analyte of interest. For example, the analyte of interest may be an enzyme (e.g., a cellular enzyme) and the analyte detection reagent may be a substrate for the enzyme. In some cases, contacting the analyte detection reagent (e.g., enzyme substrate) to the analyte of interest (e.g., enzyme) may produce a detectable signal as the substrate is converted by the enzyme.

Samples that may be assayed with the subject methods may include both simple and complex samples. Simple samples are samples that include the analyte of interest, and may or may not include one or more molecular entities that are not of interest, where the number of these non-interest molecular entities may be low, e.g., 10 or less, 5 or less, etc. Simple samples may include initial biological or other samples that have been processed in some manner, e.g., to remove potentially interfering molecular entities from the sample. By "complex sample" is meant a sample that may or may not have the analyte of interest, but also includes many different proteins and other molecules that are not of interest. In some instances, the complex sample assayed in the subject methods is one that includes 10 or more, such as 20 or more, including 100 or more, e.g., $10^3$ or more, $10^4$ or more (such as 15,000; 20,000 or 25,000 or more) distinct (i.e., different) molecular entities, that differ from each other in terms of molecular structure or physical properties (e.g., molecular mass, size, charge, isoelectric point, etc.).

In certain embodiments, the samples of interest are biological samples, such as, but not limited to, urine, blood, serum, plasma, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue (e.g., samples obtained from laser capture microdissection (LCM)), and the like. The sample can be a biological sample or can be extracted from a biological sample derived from humans, animals, plants, fungi, yeast, bacteria, tissue cultures, viral cultures, or combinations thereof using conventional methods for the successful extraction of DNA, RNA, proteins and peptides. In certain embodiments, the sample is a fluid sample, such as a solution of analytes in a fluid. The fluid may be an aqueous fluid, such as, but not limited to water, a buffer, and the like.

As described above, the samples that may be assayed in the subject methods may include one or more analytes of interest. Examples of detectable analytes include, but are not limited to: nucleic acids, e.g., double or single-stranded DNA, double or single-stranded RNA, DNA-RNA hybrids, DNA aptamers, RNA aptamers, etc.; proteins and peptides, with or without modifications, e.g., antibodies, diabodies, Fab fragments, DNA or RNA binding proteins, phosphorylated proteins (phosphoproteomics), peptide aptamers, epitopes, and the like; small molecules such as inhibitors, activators, ligands, etc.; oligo or polysaccharides; mixtures thereof; and the like.

In certain embodiments, the method is configured to separate and/or detect constituents of interest in a sample, where the sample size is small. For example, the method may be configured to separate and/or detect constituents of interest in a sample, where the sample size is 1 mL or less, such as 750 µL or less, including 500 µL or less, or 250 µL or less, of 100 µL or less, or 75 µL or less, or 50 µL or less, or 40 µL or less, or 30 µL or less, or 20 µL or less, or 10 µL or less, or 5 µL or less, or 1 µL or less. In some instances, the method is configured to separate and/or detect constituents of interest in a sample, where the sample size is 20 µL or less.

In certain embodiments, the method includes concentrating, diluting, or buffer exchanging the sample prior to directing the sample through the separation medium. Concentrating the sample may include contacting the sample with a concentration medium prior to contacting the sample with the separation medium. The concentration medium may include a small pore size polymeric gel, a membrane (e.g., a size exclusion membrane), combinations thereof, and the like. Concentrating the sample prior to contacting the sample with the separation medium may facilitate an increase in the resolution between the bands of analytes in the separated sample because each separated band of analyte may disperse less as the sample traverses through the separation medium. Diluting the sample may include contacting the sample with additional buffer prior to contacting the sample with the separation medium. Buffer exchanging the sample may include contacting the sample with a buffer exchange medium prior to contacting the sample with the separation medium. The buffer exchange medium may include a buffer different from the sample buffer. The buffer exchange medium may include, but is not limited to, a molecular sieve, a porous resin, and the like.

In certain embodiments, the method includes contacting the separated analytes bound to the separation medium with a blocking reagent prior to detecting the analyte of interest. In some cases, contacting the separated analytes with a blocking reagent prior to detecting the analyte of interest may facilitate a minimization in non-specific binding of a detectable label to the separated analytes. For example, contacting the separated analytes with the blocking reagent prior to detecting the analyte of interest may facilitate a minimization in non-specific binding of a labeled antibody to the separated analytes. The blocking reagent can be any blocking reagent that functions as described above, and may include, but is not limited to, bovine serum albumin (BSA), non-fat dry milk, casein, and gelatin. In other embodiments, no blocking step is required. Thus, in these embodiments, the method does not include a blocking step prior to detecting the analyte of interest.

In certain embodiments, the method also includes optional washing steps, which may be performed at various times before, during and after the other steps in the method. For example, a washing step may be performed after binding the separated sample to the separation medium, after contacting the separated sample with the blocking reagent, after contacting the separated sample with the detectable label, etc.

Embodiments of the method may also include releasing the analyte bound to the separation medium. The releasing may include contacting the bound analyte with a releasing agent. The releasing agent may be configured to disrupt the binding interaction between the analyte and the separation medium. In some cases, the releasing agent is a reagent, buffer, or the like, that disrupts the binding interaction between the analyte and the separation medium causing the separation medium to release the analyte. After releasing the analyte from the separation medium, the method may include transferring the analyte away from the separation medium. For example, the method may include directing the released analyte downstream from the separation medium for secondary analysis with a secondary analysis device such as, but is not limited to, a UV spectrometer, and IR spectrometer, a mass spectrometer, an HPLC, an affinity assay device, a second device as described herein, and the like.

In some embodiments, the methods include the uniplex analysis of an analyte in a sample. By "uniplex analysis" is meant that a sample is analyzed to detect the presence of one analyte in the sample. For example, a sample may include a mixture of an analyte of interest and other molecular entities that are not of interest. In some cases, the methods include the uniplex analysis of the sample to determine the presence of the analyte of interest in the sample mixture.

Certain embodiments include the multiplex analysis of two or more analytes in a sample. By "multiplex analysis" is meant that the presence two or more distinct analytes, in which the two or more analytes are different from each other, is determined. For example, analytes may include detectable differences in their molecular mass, size, charge (e.g., mass to charge ratio), isoelectric point, and the like. In some instances, the number of analytes is greater than 2, such as 4 or more, 6 or more, 8 or more, etc., up to 20 or more, e.g., 50 or more, including 100 or more, distinct analytes. In certain embodiments, the methods include the multiplex analysis of 2 to 100 distinct analytes, such as 4 to 50 distinct analytes, including 4 to 20 distinct analytes. In certain embodiments, multiplex analysis also includes the use of two or more different detectable labels. The two or more different detectable labels may specifically bind to the same or different analytes. In some cases, the two or more different detectable labels may specifically bind to the same analyte. For instance, the two or more different detectable labels may include different antibodies specific for different epitopes on the same analyte. The use of two or more detectable labels specific for the same analyte may facilitate the detection of the analyte by improving the signal-to-noise ratio. In other cases, the two or more different detectable labels may specifically bind to different analytes. For example, the two or more detectable labels may include different antibodies specific for epitopes on different analytes. The use of two or more detectable labels each specific for different analytes may facilitate the detection of two or more respective analytes in the sample in a single assay.

In certain embodiments, the method is an automated method. As such, the method may include a minimum of user interaction with the devices and systems after introducing the sample into the device. For example, the steps of separating the sample constituents in the separation medium to produce a separated sample and applying the stimulus to the separation medium to covalently bond the constituents to the separation medium may be performed by the device and system, such that the user need not manually perform these steps. In some cases, the automated method may facilitate a reduction in the total assay time. For example, embodiments of the method, including the separation and detection of analytes in a sample, may be performed in 120 minutes or less, such as 90 minutes or less, or 60 minutes or less, or 45 minutes or less, or 30 minutes or less, such as 20 minutes or less, including 15 minutes or less, or 10 minutes or less, or 5 minutes or less, or 2 minutes or less, or 1 minute or less.

Aspects of embodiments of the methods may also include methods of producing a separation medium. The method of producing the separation medium in a flow path may include providing precursor moieties in the flow path. For instance, the flow path may be filled with the precursor moieties (e.g., gel precursors, such as polyacrylamide gel precursors). In some cases, the method includes activating the precursor moieties to form the separation medium. For example, activating the gel precursors may include chemically activating the gel precursors by contacting the gel precursors with an activation agent, such as, but not limited to, a peroxide. In certain cases, activating the gel precursors includes photo-activating the gel precursors by contacting the gel precursors with light. As described above, the light used to activate formation of the separation medium may have a wavelength of blue light in the visible spectrum. For instance, the light used to activate formation of the separation medium may have a wavelength ranging from 400 nm to 500 nm, such as from 410 nm to 490 nm, including from 420 nm to 480 nm, or from 430 nm to 480 nm, or from 440 nm to 480 nm, or from 450 nm to 480 nm, or from 460 nm to 480 nm, or from 465 nm to 475 nm. In certain cases, the light used to activate formation of the separation medium has a wavelength ranging from 465 to 475 nm. In some instances, the light used to activate formation of the separation medium has a wavelength of 470 nm.

In certain embodiments, the method includes storing the polymeric separation medium. For example, the method may include storing the polymeric separation medium by dehydrating the polymeric separation medium. The polymeric separation medium may be stored for an extended period of time, such as, but not limited to, 1 day, 2 days, 3 days, 4 days, 5 days, 6 days, 1 week, 2 weeks, 3 weeks, 1 month, 2 months, 3 months, 4 months, 5 months, 6 months or more. In some embodiments, the method further includes rehydrating the polymeric separation medium. The rehydrated polymeric separation medium may be used in any of the assay steps described herein.

Systems

Aspects of certain embodiments include a system for detecting an analyte in a fluid sample. In some instances, the system includes a device as described herein.

In certain embodiments, the system also includes a detector. In some cases, the detector is a detector configured to detect a detectable label. The detector may include any type of detector configured to detect the detectable label used in the assay. As described above, detectable label may be a fluorescent label, colorimetric label, chemiluminescent label, multicolor reagent, enzyme-linked reagent, avidin-streptavidin associated detection reagent, radiolabel, gold particle, magnetic label, etc. In some instances, the detectable label is a fluorescent label. In these instances, the detector may be configured to contact the fluorescent label with electromagnetic radiation (e.g., visible, UV, x-ray, etc.), which excites the fluorescent label and causes the fluorescent label to emit detectable electromagnetic radiation (e.g., visible light, etc.). The emitted electromagnetic radiation may be detected by the detector to determine the presence of the labeled analyte bound to the separation medium. In certain embodiments, the detector is operatively coupled to the device for detecting an analyte in a fluid sample as described herein. For example, the detector may be operatively coupled to the device, such as including a device holder or device stage in or on which the device may be positioned during detection of a detectable label used in an assay.

In some instances, the detector may be configured to detect emissions from a fluorescent label, as described above. In certain cases, the detector includes a photomultiplier tube (PMT), a charge-coupled device (CCD), an intensified charge-coupled device (ICCD), a complementary metal-oxide-semiconductor (CMOS) sensor, a visual colorimetric readout, a photodiode, and the like.

The system may also include a source of electromagnetic radiation (i.e., an electromagnetic radiation source). In some cases, the electromagnetic radiation source is a light source. For example, the light source may include a visible light source, a UV light source, an infrared light source, etc. In some instances, the electromagnetic radiation source includes a light source, such as a UV light source. As described above, the electromagnetic radiation source may be used to apply electromagnetic radiation to the separation medium in the device to covalently bond sample constituents to the separation medium.

Systems of the present disclosure may include various other components as desired. For example, the systems may include fluid handling components, such as microfluidic fluid handling components. The fluid handling components may be configured to direct one or more fluids through the device. In some instances, the fluid handling components are configured to direct fluids, such as, but not limited to, fluid samples, buffers (e.g., electrophoresis buffers, wash buffers, release buffers, etc.), and the like. In certain embodiments, the microfluidic fluid handling components are configured to deliver a fluid to the separation medium of the device, such that the fluid contacts the separation medium. The fluid handling components may include microfluidic pumps. In some cases, the microfluidic pumps are configured for pressure-driven microfluidic handling and routing of fluids through the devices and systems disclosed herein. In certain instances, the microfluidic fluid handling components are configured to deliver small volumes of fluid, such as 1 mL or less, such as 500 μL or less, including 100 μL or less, for example 50 μL or less, or 25 μL or less, or 10 μL or less, or 5 μL or less, or 1 μL or less.

In certain embodiments, the systems include one or more electric field generators. An electric field generator may be configured to apply an electric field to various regions of the device. The system may be configured to apply an electric field such that the sample is electrokinetically transported through the device. For example, the electric field generator may be configured to apply an electric field to the separation medium. In some cases, the applied electric field may be aligned with the directional axis of the separation medium. As such, the applied electric field may be configured to electrokinetically transport the analytes and components in a sample through the separation medium. In some instances, the electric field generators are configured to apply an electric field with a strength ranging from 10 V/cm to 1000 V/cm, such as from 100 V/cm to 800 V/cm, including from 200 V/cm to 800 V/cm, or from 200 v/cm to 600 V/cm.

In certain embodiments, the system includes an electric field generator configured to apply an electric field such that analytes and/or constituents in the sample are isoelectrically focused in the separation medium. For instance, an applied electric field may be aligned with the directional axis of the separation medium and configured to isoelectrically focus the sample constituents along the directional axis of the separation medium.

In certain embodiments, the subject system is a biochip (e.g., a biosensor chip). By "biochip" or "biosensor chip" is meant a microfluidic system that includes a substrate surface which displays two or more distinct devices on the substrate surface. In certain embodiments, the microfluidic system includes a substrate surface with an array of devices.

An "array" includes any two-dimensional or substantially two-dimensional (as well as a three-dimensional) arrangement of addressable regions, e.g., spatially addressable regions. An array is "addressable" when it has multiple devices positioned at particular predetermined locations (e.g., "addresses") on the array. Array features (e.g., devices) may be separated by intervening spaces. Any given substrate may carry one, two, four or more arrays disposed on a front surface of the substrate. Depending upon the use, any or all of the arrays may be the same or different from one another and each may contain multiple distinct devices. An array may contain one or more, including two or more, four or more, eight or more, 10 or more, 25 or more, 50 or more, or 100 or more devices. In certain embodiments, the devices can be arranged into an array with an area of 100 $cm^2$ or less, 50 $cm^2$ or less, or 25 $cm^2$ or less, 10 $cm^2$ or less, 5 $cm^2$ or less, such as 1 $cm^2$ or less, including 50 $mm^2$ or less, 20 $mm^2$ or less, such as 10 $mm^2$ or less, or even smaller. For example, devices may have dimensions in the range of 10 mm×10 mm to 200 mm×200 mm, including dimensions of 100 mm×100 mm or less, such as 50 mm×50 mm or less, for instance 25 mm×25 mm or less, or 10 mm×10 mm or less, or 5 mm×5 mm or less, for instance, 1 mm×1 mm or less.

Arrays of microfluidic devices may be arranged for the multiplex analysis of samples. For example, two or more microfluidic devices may be disposed on a support, such as 5 or more, or 10 or more, or 20 or more, or 30 or more, or 40 or more, or 50 or more, or 60 or more, or 70 or more, or 80 or more, or 90 or more, or 100 or more microfluidic devices on a support. In some embodiments, two or more microfluidic devices are arranged in series. In certain embodiments, two or more microfluidic devices are arranged in series, such as 3 or more, or 4 or more, or 5 or more, or 6 or more, or 7 or more, or 8 or more, or 9 or more, or 10 or more. In certain embodiments, two or more microfluidic devices are arranged in parallel. In embodiments where two or more microfluidic devices are arranged in parallel, two or more samples may be analyzed at substantially the same time. In certain embodiments, two or more microfluidic devices (or two or more series arrangements of microfluidic devices as described above) are arranged in parallel, such as 3 or more, or 4 or more, or 5 or more, or 6 or more, or 7 or more, or 8 or more, or 9 or more, or 10 or more. In certain instances, two or more separation media are arranged in series (as described above) and two or more of these series arrangements of separation media are arranged in parallel as described above.

Aspects of the systems include that the devices may be configured to consume a minimum amount of sample while still producing detectable results. For example, the system may be configured to use a sample volume of 100 µL or less, such as 75 µL or less, including 50 µL or less, or 25 µL or less, or 10 µL or less, for example, 5 µL or less, 2 µL or less, or 1 µL or less while still producing detectable results. In certain embodiments, the system is configured to have a detection sensitivity of 1 nM or less, such as 500 pM or less, including 100 pM or less, for instance, 1 pM or less, or 500 fM or less, or 250 fM or less, such as 100 fM or less, including 50 fM or less, or 25 fM or less, or 10 fM or less. In some instances, the system is configured to be able to detect analytes at a concentration of 1 µg/mL or less, such as 500 ng/mL or less, including 100 ng/mL or less, for example, 10 ng/mL or less, or 5 ng/mL or less, such as 1 ng/mL or less, or 0.1 ng/mL or less, or 0.01 ng/mL or less, including 1 pg/mL or less. In certain embodiments, the system has a dynamic range from $10^{-18}$ M to 10 M, such as from $10^{-15}$ M to $10^{-3}$ M, including from $10^{-12}$ M to $10^{-6}$ M.

In some cases, the system is configured to have a signal-to-noise ratio (SNR) of 10 or more, such as 15 or more, including 20 or more, or 30 or more, or 40 or more, or 50 or more, or 60 or more, or 70 or more, or 80 or more, or 90 or more, or 100 or more, or 150 or more, or 200 or more, or 500 or more, or 1,000 or more, or 2,000 or more, or 3,000 or more, or 4,000 or more, or 5,000 or more, or 6,000 or more, or 7,000 or more, or 8,000 or more, or 9,000 or more, or 10,000 or more. In some cases, the achievable signal-to-noise ratio depends on the method of detection used in the assay. For example, in certain embodiments the analyte of interest is directly labeled with a detectable label. In these embodiments, the signal-to-noise ratio may be 10 or more, such as 15 or more, including 20 or more, or 30 or more, or 40 or more, or 50 or more, or 60 or more, or 70 or more, or 80 or more, or 90 or more, or 100 or more, or 150 or more, or 200 or more. In other embodiments, the analyte of interest is first labeled with a primary label (e.g., a primary antibody) and then the primary label is labeled with a secondary label (e.g., a secondary antibody). In these embodiments, the signal-to-noise ratio may be 100 or more, such as 150 or more, including 200 or more, or 500 or more, or 1,000 or more, or 2,000 or more, or 3,000 or more, or 4,000 or more, or 5,000 or more, or 6,000 or more, or 7,000 or more, or 8,000 or more, or 9,000 or more, or 10,000 or more.

In certain embodiments, the devices are operated at a temperature ranging from 1° C. to 100° C., such as from 5° C. to 75° C., including from 10° C. to 50° C., or from 20° C. to 40° C. In some instances, the devices are operated at a temperature ranging from 35° C. to 40° C.

In certain embodiments, the microfluidic device is configured to perform an assay (e.g., a separation of analytes in a sample) rapidly. For example, the microfluidic device may be configured to resolve (separate) analytes in a sample based on differences in their physicochemical properties in a short amount of time. In some instances, the microfluidic device may be configured to resolve (separate) analytes in a sample based on a first difference in their physicochemical properties in a first dimension and resolve (separate) analytes in the sample based on a second difference in their physicochemical properties in a second dimension in a short amount of time. In certain cases, the microfluidic device is configured to perform an assay as described above in an amount of time of 24 hours or less, or 20 hours or less, or 15 hours or less, or 10 hours or less, or 5 hours or less, or 2 hours or less, such as 1.5 hours or less, or 1 hour or less, or 55 min or less, or 50 min or less, or 45 min or less, or 40 min or less, or 35 min or less, or 30 min or less, or 25 min or less, or 20 min or less, or 15 min or less, or 10 min or less, or 5 min or less, or 4 min or less, or 3 min or less, or 2 min or less, or 1 min or less.

In some instances, a sufficient resolution is achieved such that different analytes in the sample may be distinguished from each other based on differences in one or more physicochemical properties of the analytes. For instance, the microfluidic device may be configured to produce a detectable difference between different analytes in the sample. In some instances, where the microfluidic device is configured to separate analytes by isoelectric focusing, the microfluidic device may be configured to provide a separation resolution between different analytes of 1 pH unit or less, such as 0.9 pH units or less, or 0.8 pH units or less, or 0.7 pH units or less, or 0.6 pH units or less, or 0.5 pH units or less, or 0.4 pH units or less, or 0.3 pH units or less, or 0.2 pH units or less, or 0.1 pH units or less, or 0.05 pH units or less. In some instances, where the microfluidic device is configured to separate analytes by isoelectric focusing, the microfluidic device may be configured to provide a separation resolution between different analytes of 0.1 pH units or less. In certain embodiments, the microfluidic device is configured to provide the desired separation resolution by isoelectric focusing even when analytes with different isoelectric points have similar molecular weights or molecular sizes. In certain embodiments, where the microfluidic device is configured to separate analytes based on molecular size or molecular weight, the microfluidic device may be configured to resolve analytes with molecular weight differences of 10,000 Da or less, such as 7,000 Da or less, including 5,000 Da or less, or 2,000 Da or less, or 1,000 Da or less, for example 500 Da or less, or 100 Da or less, or 75 Da or less, or 50 Da or less, or 25 D a or less. In certain embodiments, the microfluidic device is configured to provide the desired separation resolution based on molecular size or molecular weight even when analytes with different molecular size or molecular weight have similar isoelectric points.

Utility

The subject devices, systems and methods find use in a variety of different applications where determination of the presence or absence, and/or quantification of one or more analytes in a sample is desired. For example, the subject devices, systems and methods find use in the separation and detection of proteins, peptides, nucleic acids, and the like. In some cases, the subject devices, systems and methods find use in the separation and detection of proteins.

In certain embodiments, the subject devices, systems and methods provide for excellent separation performance in a dense polymer sieving matrix, while also providing for rapid reagent (e.g., detection reagent) delivery due to increased pore size. In some cases, the subject devices, systems and methods facilitate convective reagent delivery which can reduce assay time by applying an external force to deliver reagents. The subject devices, systems and methods also find use in assay protocols where no blocking/transfer steps are needed, because separation, immobilization and detection may all be performed in a single device (e.g., in a single polymeric separation medium as described herein). The subject devices, systems and methods also facilitate a minimization of resolution losses after separation, e.g., due to the immobilization of the separated constituents of interest in the polymeric separation medium as described herein.

In certain embodiments, the subject devices, systems and methods find use in the detection of nucleic acids, proteins, or other biomolecules in a sample. The methods may include the detection of a set of biomarkers, e.g., two or more distinct protein biomarkers, in a sample. For example, the methods may be used in the rapid, clinical detection of two or more disease biomarkers in a biological sample, e.g., as may be employed in the diagnosis of a disease condition in a subject, or in the ongoing management or treatment of a disease condition in a subject, etc. In addition, the subject devices, systems and methods may find use in protocols for the detection of an analyte in a sample, such as, but not limited to, Western blotting, and the like.

In certain embodiments, the subject devices, systems and methods find use in detecting biomarkers. In some cases, the subject devices, systems and methods may be used to detect the presence or absence of particular biomarkers, as well as an increase or decrease in the concentration of particular biomarkers in blood, plasma, serum, or other bodily fluids or excretions, such as but not limited to urine, blood, serum, plasma, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue (e.g., samples obtained from laser capture microdissection (LCM)), and the like.

The presence or absence of a biomarker or significant changes in the concentration of a biomarker can be used to diagnose disease risk, presence of disease in an individual, or to tailor treatments for the disease in an individual. For example, the presence of a particular biomarker or panel of biomarkers may influence the choices of drug treatment or administration regimes given to an individual. In evaluating potential drug therapies, a biomarker may be used as a surrogate for a natural endpoint such as survival or irreversible morbidity. If a treatment alters the biomarker, which has a direct connection to improved health, the biomarker can serve as a surrogate endpoint for evaluating the clinical benefit of a particular treatment or administration regime. Thus, personalized diagnosis and treatment based on the particular biomarkers or panel of biomarkers detected in an individual are facilitated by the subject devices, systems and methods. Furthermore, the early detection of biomarkers associated with diseases is facilitated by the high sensitivity of the subject devices and systems, as described above. Due to the capability of detecting multiple biomarkers on a single chip, combined with sensitivity, scalability, and ease of use, the presently disclosed devices, systems and methods find use in portable and point-of-care or near-patient molecular diagnostics.

In certain embodiments, the subject devices, systems and methods find use in detecting biomarkers for a disease or disease state. In certain instances, the subject devices, systems and methods find use in detecting biomarkers for the characterization of cell signaling pathways and intracellular communication for drug discovery and vaccine development. For example, the subject devices, systems and methods may be used to detect and/or quantify the amount of biomarkers in diseased, healthy or benign samples. In certain embodiments, the subject devices, systems and methods find use in detecting biomarkers for an infectious disease or disease state. In some cases, the biomarkers can be molecular biomarkers, such as but not limited to proteins, nucleic acids, carbohydrates, small molecules, and the like. Biomarkers and diseases or disease states that may be detected by the subject devices are described in more detail in WO 2010/135364, the disclosure of which is incorporated herein by reference.

The subject devices, systems and methods find use in diagnostic assays, such as, but not limited to, the following: detecting and/or quantifying biomarkers, as described above; screening assays, where samples are tested at regular intervals for asymptomatic subjects; prognostic assays, where the presence and or quantity of a biomarker is used to predict a likely disease course; stratification assays, where a subject's response to different drug treatments can be predicted; efficacy assays, where the efficacy of a drug treatment is monitored; and the like.

The subject devices, systems and methods also find use in validation assays. For example, validation assays may be used to validate or confirm that a potential disease biomarker is a reliable indicator of the presence or absence of a disease across a variety of individuals. The short assay times for the subject devices, systems and methods may facilitate an increase in the throughput for screening a plurality of samples in a minimum amount of time. For example, the subject devices, systems and methods find use in probed IEF separation medium for affinity reagent screening. High-throughput devices that include a separation medium as described herein may be used to select biomarker isoform-specific affinity reagents, such as specific monoclonal antibodies. Such reagents may be used in ELISA assays for disease-specific biomarker isoforms present in clinical proteinaceous samples. In some cases, reagents may be screened in serial or for their multiplexed (parallel) capability for highly specific binding.

The subject devices, systems and methods also find use in a variety of different applications where separation of one or more constituents (e.g., analytes) in a sample is desired. The constituents in the sample may be separated based on a variety of different separation techniques, such as, but not limited to, electrochromotography, electrophoretic immunoassays, equilibrium separations (including isoelectric and temperature gradient focusing), micellar electrokinetic chromatography, chromatography variants, native electrophoresis, and separation by protein mass under denaturing conditions (e.g., SDS-PAGE). Any of the separation techniques may be coupled to subsequent analyte probing by, for example, antibodies (or variants), lectins, substrates, ligands, lipids, coated particles or dyes. For example, separation based on protein sizing with subsequent antibody probing provides an integrated microfluidic Western blotting device.

In some embodiments, the devices, systems and methods of the present disclosure facilitate sample extraction or downstream processing of the separated sample, for example by subsequent immunological blotting, mass spectrometry, and the like.

In some instances, the subject devices, systems and methods can be used without requiring a laboratory setting for implementation. In comparison to the equivalent analytic research laboratory equipment, the subject devices and systems provide comparable analytic sensitivity in a portable, hand-held system. In some cases, the mass and operating cost are less than the typical stationary laboratory equipment. The subject systems and devices may be integrated into a single apparatus, such that all the steps of the assay, including separation, transfer, labeling and detecting of an analyte of interest, may be performed by a single apparatus.

For example, in some instances, there are no separate apparatuses for separation, transfer, labeling and detecting of an analyte of interest. In addition, the subject systems and devices can be utilized in a home setting for over-the-counter home testing by a person without medical training to detect one or more analytes in samples. The subject systems and devices may also be utilized in a clinical setting, e.g., at the bedside, for rapid diagnosis or in a setting where stationary research laboratory equipment is not provided due to cost or other reasons.

Kits

Aspects of the present disclosure additionally include kits that have a device as described herein. In certain embodiments, the kit may include the device and a packaging configured to contain the device. The packaging may be a sealed packaging, such as a sterile sealed packaging. By "sterile" is meant that there are substantially no microbes (such as fungi, bacteria, viruses, spore forms, etc.). In some instances, the packaging may be configured to be sealed, e.g., a water vapor-resistant packaging, optionally under an air-tight and/or vacuum seal.

In certain embodiments, the kit includes a reagent that may be used as the applied stimulus to produce a polymeric separation medium with an increased pore size as described herein. The reagent may be any one of the applied stimulus described herein, such as, but not limited to, an acid, a base, an oxidizing agent, a reducing agent, an affinity agent, a solvent, etc. The reagent in the kit may be provided in any convenient form, such as, but not limited to, a gas, a solution, a solid, granules, a powder, a suspension, and the like. The reagent may be packaged in a separate container from the device.

In certain embodiments, the kits include a buffer. For instance, the kit may include a buffer, such as an electrophoresis buffer, a sample buffer, and the like. In certain cases, the buffer is an electrophoresis buffer, such as, but not limited to, a Tris buffer, a Tris-glycine, and the like. In some instances, the buffer includes a detergent (such as sodium dodecyl sulfate, SDS). The buffer may be packaged in a separate container from the device.

The kits may further include additional reagents, such as but not limited to, release reagents, denaturing reagents, refolding reagents, detergents, detectable labels (e.g., fluorescent labels, colorimetric labels, chemiluminescent labels, multicolor reagents, enzyme-linked reagents, detection reagents (e.g., avidin-streptavidin associated detection reagents), calibration standards, radiolabels, gold particles, magnetic labels, etc.), and the like.

In certain embodiments, the kit may include an analyte detection reagent, such as a detectable label, as described herein. The detectable label may be associated with a member of a specific binding pair. Suitable specific binding pairs include, but are not limited to: a member of a receptor/ligand pair; a ligand-binding portion of a receptor; a member of an antibody/antigen pair; an antigen-binding fragment of an antibody; a hapten; a member of a lectin/carbohydrate pair; a member of an enzyme/substrate pair; biotin/avidin; biotin/streptavidin; digoxin/antidigoxin; a member of a DNA or RNA aptamer binding pair; a member of a peptide aptamer binding pair; and the like. In certain embodiments, the member of the specific binding pair includes an antibody. The antibody may specifically bind to an analyte of interest in the separated sample bound to the separation medium. For example, the detectable label may include a labeled antibody (e.g., a fluorescently labeled antibody) that specifically binds to the analyte of interest.

In addition to the above components, the subject kits may further include instructions for practicing the subject methods. These instructions may be present in the subject kits in a variety of forms, one or more of which may be present in the kit. One form in which these instructions may be present or provided is as printed information on a suitable medium or substrate, e.g., a piece or pieces of paper on which the information is printed, in the packaging of the kit, in a package insert, etc. Another form would be a computer readable medium, e.g., CD, DVD, Blu-Ray, computer-readable memory (e.g., flash memory), etc., on which the information has been recorded or stored. Yet another form in which instructions may be present or provided is a website address which may be used via a network (e.g., the Internet) to access the information at a removed site. Any convenient approach may be present in the kits.

As can be appreciated from the disclosure provided above, embodiments of the present invention have a wide variety of applications. Accordingly, the examples presented herein are offered for illustration purposes and are not intended to be construed as a limitation on the invention in any way. Those of ordinary skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by mass, molecular mass is mass average molecular mass, temperature is in degrees Celsius, and pressure is at or near atmospheric.

EXAMPLES

Example 1

Summary

Intra-polymer assays on immobilized biomolecules by expanding polymer pore-size after or concurrent with biomolecule immobilization are described. Polymer expansion facilitated the rapid delivery of reagents to the immobilized biomolecules, which finds use for large reagents such as antibodies. High-throughput in-gel Western blotting experiments were performed. Initially, a dense polyacrylamide gel was used for high-resolution electrophoretic protein separation, and then proteins were immobilized in the gel. After immobilization the polyacrylamide gel pores were expanded. Once expanded, antibodies were introduced into the pore-size expanded polymer to probe the immobilized biomolecules.

FIG. 1 shows a schematic drawing of an assay using a polymeric separation medium according to embodiments of the present disclosure. As shown in FIG. 1, a polymeric separation medium is used to perform separation (e.g., PAGE) of analytes in a sample (FIG. 1, step 1). The separated analytes are then immobilized in the polymeric separation medium (FIG. 1, step 2). An applied stimulus is applied to the polymeric separation medium to produce a polymeric separation medium with an increased average pore size (FIG. 1, step 3). Detection reagents (e.g., labeled antibodies) are introduced into the polymeric separation medium for detection of the immobilized analytes of interest (FIG. 1, step 4).

Results for two different pore-expansion strategies: (1) a polyacrylamide gel crosslinked with a mixture of stable (e.g., non-labile) and labile crosslinkers; and (2) a composite polyacrylamide/agarose gel, are presented in this example.

Experiments were performed to facilitate the rapid delivery of reagents to intra-polymer immobilized biomolecules through polymer pore-size expansion. With pore-size expansion—the tradeoff between separation quality (where a high density polymer is favorable) and large reagent delivery (where a low density polymer is favorable) can be circumvented for high quality separations and large reagent delivery. Aspects of embodiments of the present disclosure include:

Integration with biomolecule separations in a dense polymer sieving matrix: Prior to pore-size expansion, a dense polymer was used as a sieving medium for high resolution analytical separations. After biomolecule immobilization, the pore-size was increased to facilitate reagent delivery.

In-gel immunoprobing: By expanding the pore-size of the polymer, large reagents (e.g., antibodies) were delivered while minimizing non-specific immobilization in the polymer matrix.

Convective reagent delivery: Since the biomolecules were immobilized prior to pore-expansion and reagent delivery—an external force can be used to rapidly deliver reagents to the biomolecule sample with minimal loss of the sample and its spatial resolution after a separation. Examples of external forces to deliver reagents include electrophoretic, hydrodynamic, magnetic, and dielectrophoretic forces.

Methods for Polymer Pore-Size Expansion

Methods for expanding the pore-size of a polymeric separation medium are discussed below.

Polymer De-Crosslinking

A polymer with labile crosslinkers was de-crosslinked by an applied stimulus. To minimize complete gel dissolution with the applied stimulus, a composite crosslinked gel was used which was partly crosslinked with labile crosslinkers and partly crosslinked with stable (e.g., non-labile) crosslinkers (e.g., N,N'-methylenebisacrylamide), thus expanding the polymer pore-size when the labile crosslinkers were removed. Examples of labile crosslinkers and stimuli are listed below.

Ethylene glycol diacrylate (EDA)—alkaline cleaved
Acid cleaved crosslinkers
N,N'-(1,2-Dihydroxyethylene)bisacrylamide (DHEBA) or N—N' diallyltartardiamide (DATD)—oxidation cleaved (with periodic acid)
N,N'-Bis(acryloyl)cystamine (BAC)—reduction cleaved
Photo cleaved crosslinkers
Molecular affinity crosslinkers Composite Polymer with a Dissolvable Component (e.g., Thermoset/Thermoplastic)

A composite polymer was used for modulating polymer pore size. Initially, the composite gel was used as a dense polymer matrix. Then, after biomolecule immobilization, an applied stimulus was used on the composite gel to dissolve a portion of the polymer. In the example discussed below a thermoset/thermoplastic polymer (e.g., composite agarose and polyacrylamide gel) was used for modulating polymer pore-size, where the stimuli post immobilization was heating to dissolve the thermoplastic—thus leaving the thermoset polymer and a polymeric separation medium having an increased polymer pore-size.

Induced Polymer Swelling for Pore-Expansion

Other types of polymers can be made to dialate and contract under various stimuli. Examples include thermally responsive gel swelling (e.g., N-isopropyl acrylamide), solvent dependent gel swelling, and photo-responsive gel swelling.

Methods for Biomolecule Immobilization

Biomolecules can be immobilized in the polymer using a number of techniques. In the example discussed below, covalent photocapture (e.g., benzophenone methacrylate; BP-AMPA) was used for immobilization. Other methods of immobilization include chemical fixation (e.g., formaldehyde fixation).

Methods for Reagent Delivery

Reagents can be delivered to the immobilized biomolecules using a number of methods. In the example discussed below, diffusion was used. Other methods for reagent delivery include electrophoresis, magnetophoresis, hydrodynamic forces and dielectrophoresis.

Example 2: Polymer Decrosslinking

A labile crosslinker was used in a composite crosslinked polyacrylamide gel for pore-expansion. Diacrylamide Ketal labile crosslinker (CAS: 118676-84-9) was used, which has the following attributes: (1) Cleaved under conditions that minimize damage to protein epitopes; (2) Rapid de-crosslinking; (3) Neutral products after de-crosslinking; and (4) Stable for long-term storage in typical electrophoresis buffers; e.g., Tris/Glycine 8.3 pH, 0.1% SDS Chemical Structure of Diamine Ketal Labile Crosslinker (DK):

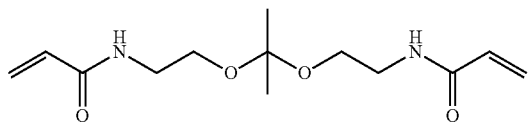 [SMILES: C=CC(=O)NCCOC(C)(C)OCCNC(=O)C=C]

CAS: 118676-84-9

Empirical Formula: $C_{13}H_{22}N_2C_4$

Chemical Name: N-[2-[2-[2-(prop-2-enoylamino)ethoxy]propan-2-yloxy]ethyl]prop-2-enamide Pore-expansion was performed by fabricating a polyacrylamide gel with a stable crosslinker, (N,N'-Methylenebisacrylamide; Bis), and a labile crosslinker, diacrylamide ketal, by substituting the labile crosslinker on a mole for mole basis for the stable crosslinker. The molar ratio between cleavable and total crosslinker was varied from 0.99 to 0.25. Gel compositions are shown in Table 2 below. To provide for gel stability post decrosslinking, Bis concentrations of ~0.3 mg/ml were typically used. Benzophoenone Methacrylate (BP-APMA) was also incorporated in the precursor solution, to allow for photo-immobilization of proteins or other biomolecules by exposure to UV light.

TABLE 2

Typical gel compositions used in pore-expansion polyacrylamide gels.

| % T | % C | Molar Labile to Total Crosslinker Ratio | Acrylamide [mg/ml] | Bis [mg/ml] | Diacrylamide Ketal [mg/ml] | BP-APMA [µg/ml] |
|---|---|---|---|---|---|---|
| 8  | 5 | 0.925 | 76.00  | 0.30 | 6.48 | 1.60 |
| 10 | 5 | 0.94  | 95.00  | 0.30 | 8.23 | 1.60 |
| 12 | 5 | 0.95  | 114.00 | 0.30 | 9.98 | 1.60 |

Decrosslinking Dynamics

Figure 2:
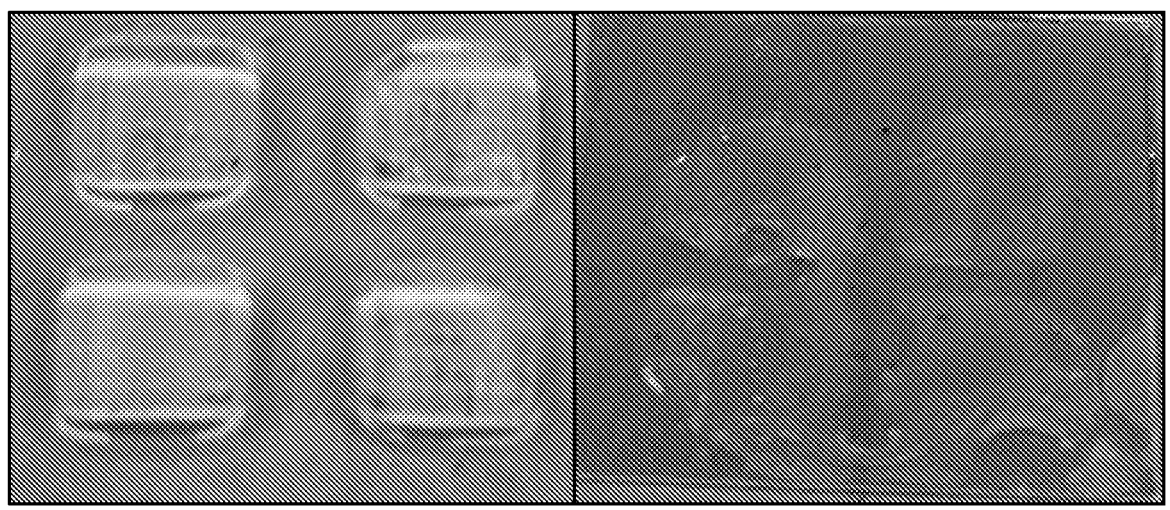
FIG. 2 (left) shows an image of an initial polyacrylamide gel structure that includes a labile crosslinker, and FIG. 2 (right) shows an image of the decrosslinked gel after exposure to an applied stimulus, according to embodiments of the present disclosure.

To assess decrosslinking dynamics, polyacrylamide gels crosslinked with 100% diacrylamide ketal were fabricated and then exposed to an acidic 1% HCl solution to determine the dissolution rate. FIG. 2, left, shows an image of the initial gel structure, and FIG. 2, right, shows an image of the fully dissolved structures after 5 minutes of exposure to the acidic solution.

Figure 3:
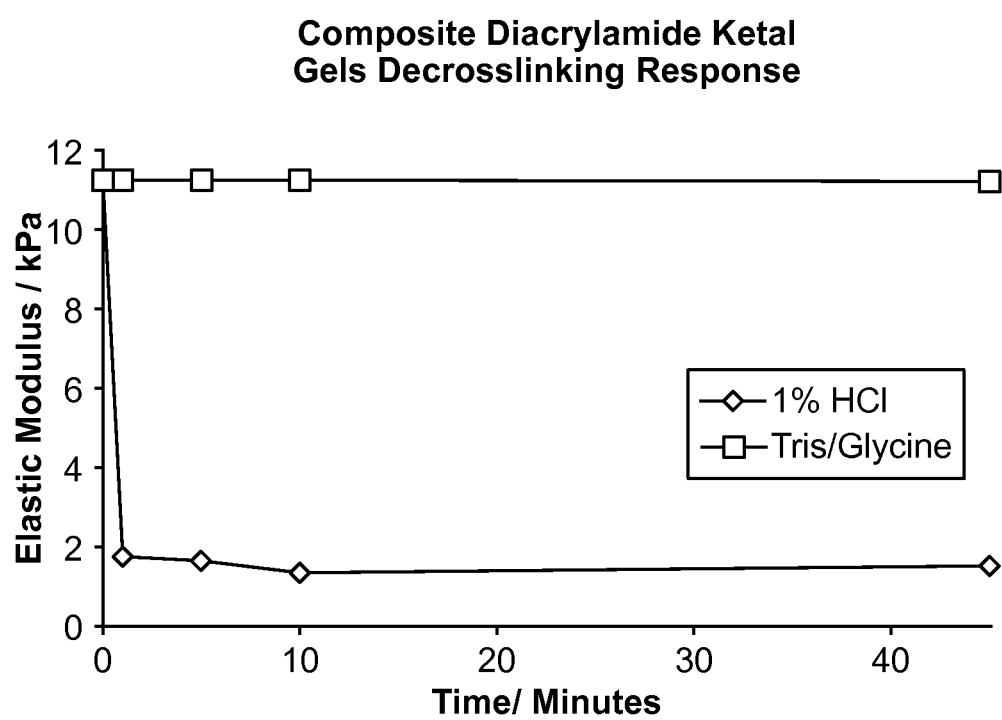
FIG. 3 shows a graph of the elastic modulus (kPa) vs. time (min) to assess decrosslinking dynamics for polymeric gels, according to embodiments of the present disclosure.

To characterize decrosslinking dynamics in a composite gel, 10% T polyacrylamide gels were fabricated with a 0.94 molar ratio of diacrylamide ketal (gel composition shown in Table 2). The gel was exposed to 1% HCl for various periods of time, from 1 minute to 45 minutes. As a control, another gel was exposed to 1× Tris/Glycine for the same time period. Strain-controlled rheometry was performed to periodically to assess the elastic modulus and thus the dynamic changes to the composition of the gel. FIG. 3 shows a graph of the elastic modulus (kPa) vs. time (min) to assess decrosslinking dynamics for the composite gel.

Within 1 minute exposure of HCl, the elastic modulus reduced from 11.2 kPa to 1.7 kPa, and in 45 minutes of HCl exposure to 1.5 kPa. This indicated that the majority of diacrylamide ketals were cleaved within the first minute of acid exposure. In contrast, the gel exposed to Tris/glycine, a common electrophoresis buffer, did not show significant rheological changes over a 1 day period. This indicated that diacrylamide ketal composite crosslinked polyacrylamide gels were stable for fabrication, storage, and electrophoresis operation in standard electrophoresis buffers.

Mobility Shift after Decrosslinking

Figure 4:
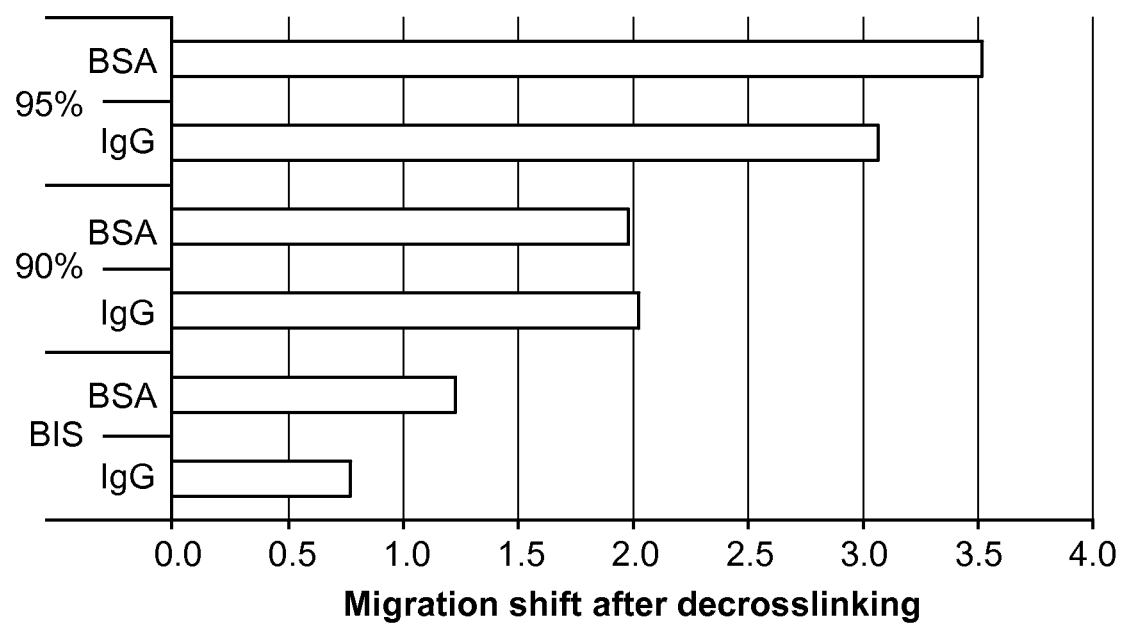
FIG. 4 shows a graph of migration shift after decrosslinking for crosslinked polyacrylamide gels before and after decrosslinking, according to embodiments of the present disclosure.

Experiments were performed to characterize how the sieving matrix in labile composite crosslinked polyacrylamide gels was modified before and after decrosslinking. Mobility measurements were performed for bovine serum albumin (BSA) and immunoglobulin (IgG) in 20% T polyacrylamide gels with 3.3% C with 0%, 90% and 95% molar ratios of diacrylamide ketal crosslinker to total crosslinker. Electrophoresis was performed in the gels. Then the gels were decrosslinked in 1% HCl with 1× Tris/Glycine for 30 minutes, allowed to equilibrate in Tris/Glycine for 10 minutes, and the electrophoresis tests were repeated. The ratio of protein mobilities after decrosslinking/before decrosslinking were calculated to determine the migration shift. The results of the experiment are shown in FIG. 4.

The gels with no labile crosslinker (denoted as 0% or Bis) showed no shift in mobility after decrosslinking. The gels that contained diacrylamide ketal showed a significant increase in both BSA and IgG mobilities; approximately 3 fold increase for 95% diacrylamide ketal crosslinked gels and approximately 2 fold increase for 90% diacrylamide ketal crosslinked gels. See FIG. 4.

Western Blotting in Decrosslinked Polyacrylamide Gels

Experiments were performed to determine whether decrosslinked gels improved antibody probing results for proteins immobilized within the sieving matrix. A 10% T polyacrylamide gel with 90% diacrylamide ketal labile crosslinker was fabricated. The gel also included 1.6 µg/ml of BP-APMA such that photo-immobilization could be performed on proteins prior to decrosslinking.

Figure 5:
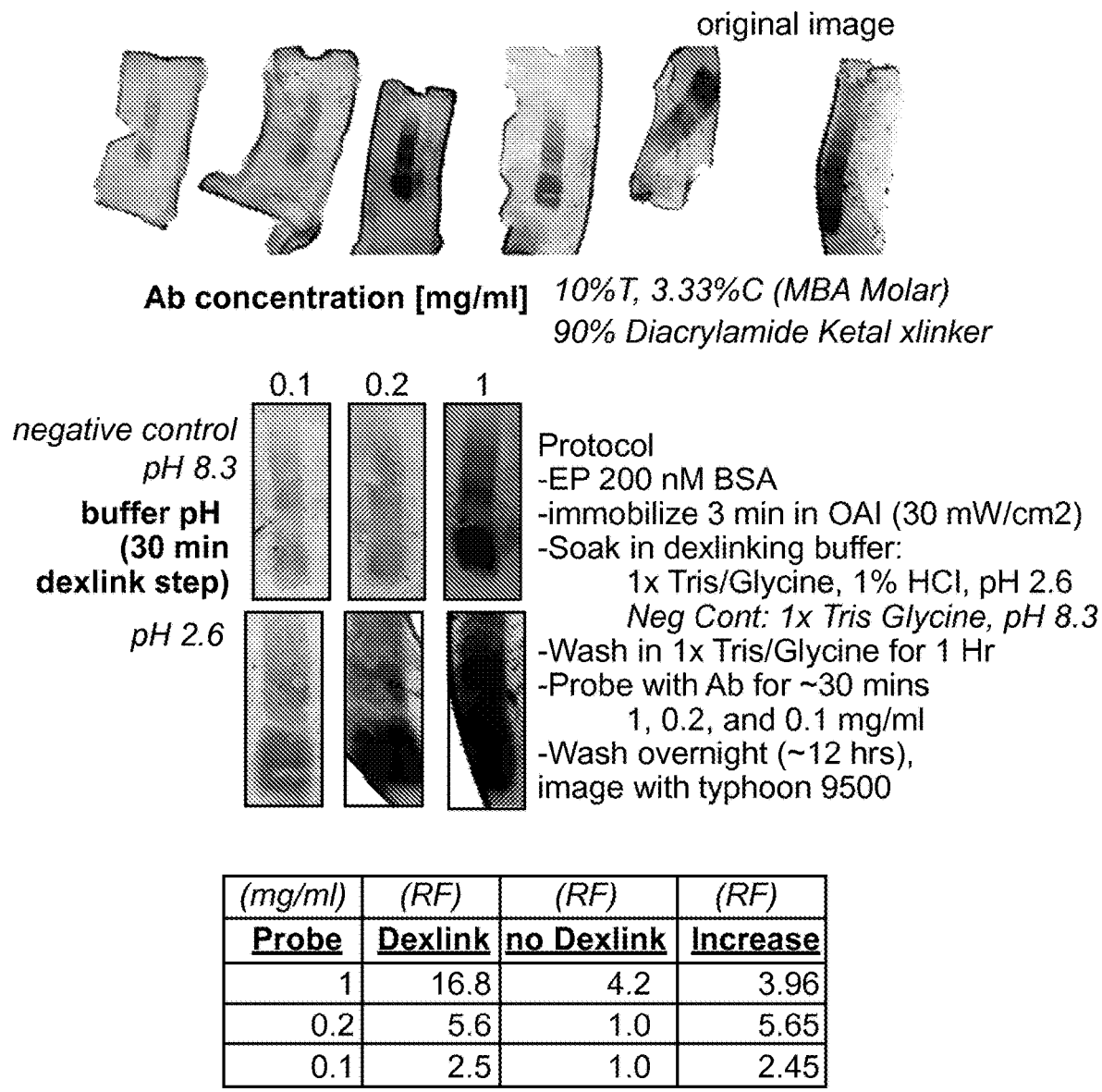
FIG. 5 shows images of polymeric separation media used for Western blotting assays, according to embodiments of the present disclosure.

The Western blot assay was performed as follows:
1. SDS PAGE was performed for a 200 nM BSA sample.
2. BSA photocapture was performed using a 3 min UV exposure (30 mW/cm$^2$ @365 nm)
3. Gel decrosslinking was performed
   a. 1% HCl and Tris/Glycine
   b. Negative control: Tris/Glycine
4. Gel equilibration in Tris/Glycine
5. Diffusive Antibody probing for 30 minutes
6. Antibody washout—12 hours
7. Gel imaging Western Blotting Results Antibody probing signal in decrosslinked gels showed a 2.45 to 5.65 fold increase over the antibody probing in non-decrosslinked gels. FIG. 5 shows images of gels used for the Western blotting assay.

Composite Agarose/Polyacrylamide Gels

Experiments were performed to provide for pore-expansion using a composite polymer with a stable component and a dissolvable component. Bis crosslinked polyacrylamide gels were used as the stable polymer (e.g., thermoset polymer), and agarose was used as the dissolvable portion (e.g., thermoplastic). The gel was heated to liquefy and remove the agarose thermoplastic to achieve the desired pore-expansion.

Figure 6:
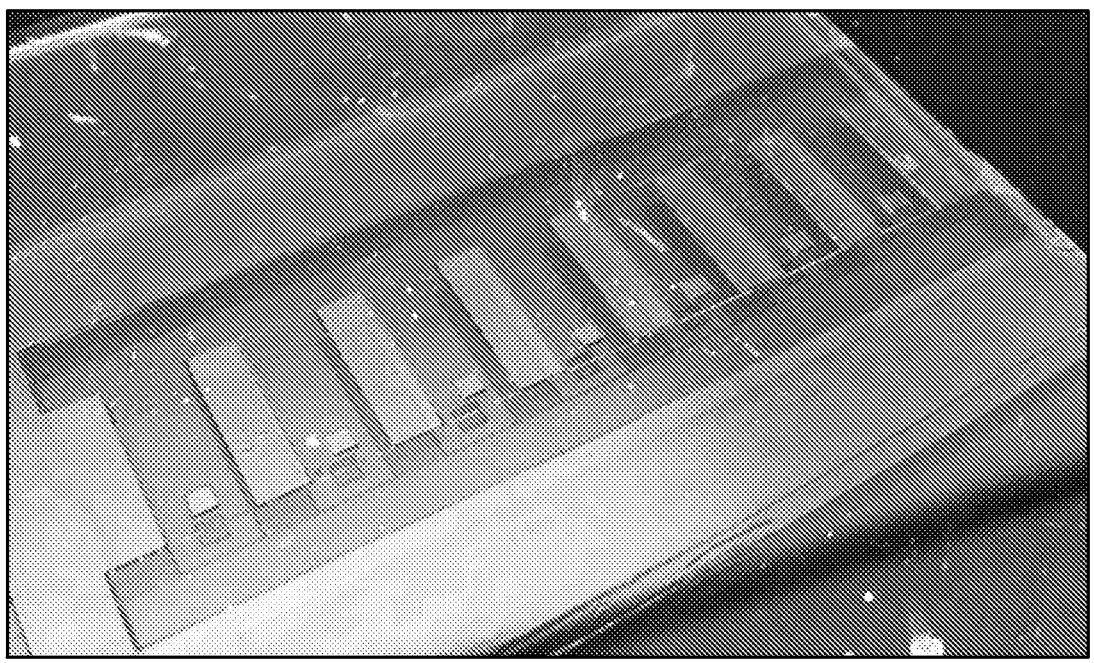
FIG. 6 shows an image of the fabrication of agarose/polyacrylamide gels, according to embodiments of the present disclosure.

As agarose cannot be photo-patterned, kapton tape molds were used to fabricate the agarose/polyacrylamide gel structures. See FIG. 6.

The fabrication protocol used was as follows:
1. Kapton was wiped with GelSlick
2. 2×PAG precursor and molten agarose were mixed @ 50° C.
3. A layer of PAG/Agarose precursor was poured in the mold
4. PAG GelBond was placed on-top of the mold, a glass plate was placed on top and pressure was applied
5. The setup was exposed to UV light (with long pass filter)

To determine whether adding agarose increased protein sieving properties, electrophoresis was performed in the following gels: (a) 6% T 3.33% C, 0% Agarose; (b) 6% T 3.33% C, 1% Agarose; and (c) 6% T 3.33% C, 2% Agarose.

Figure 7:
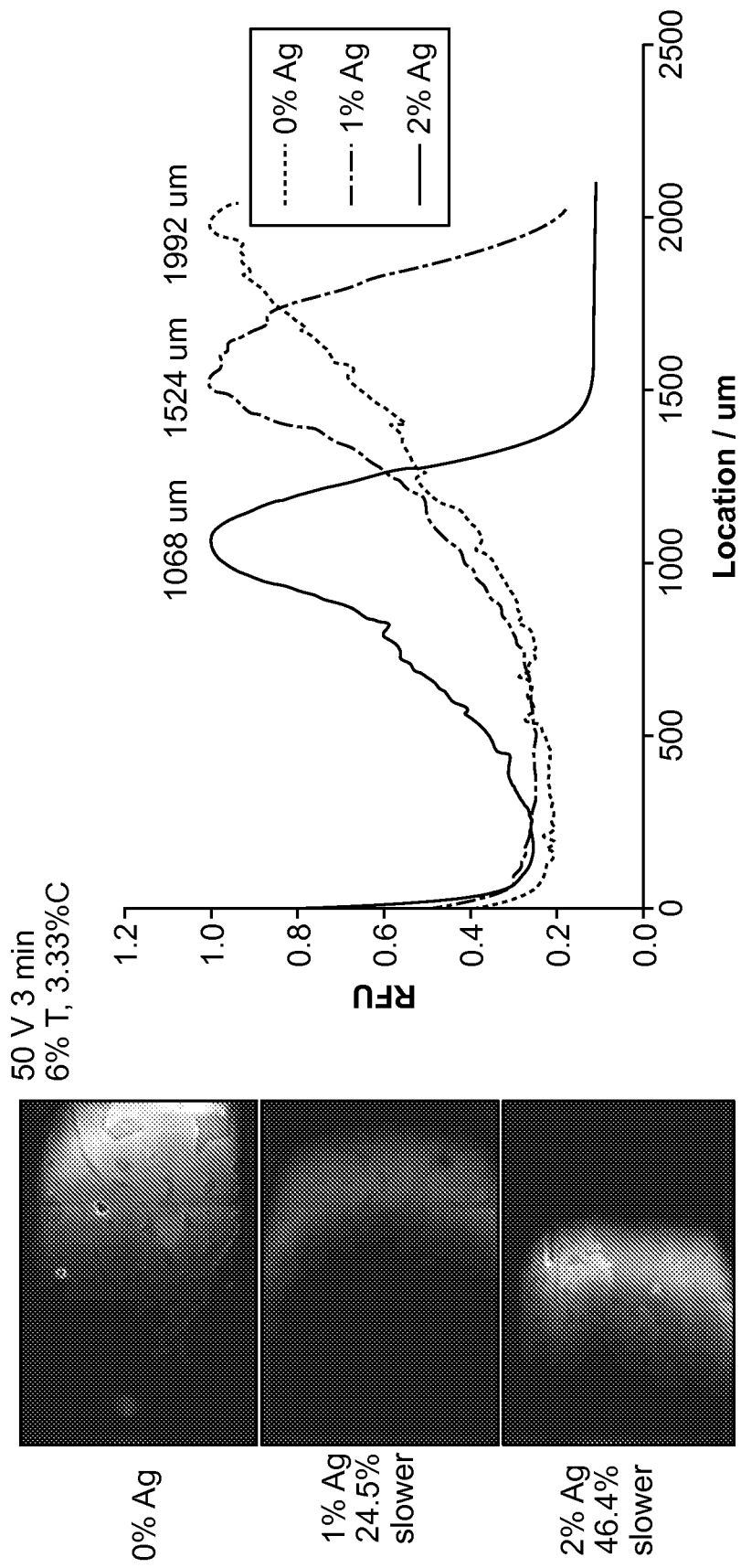
FIG. 7 (left) shows images of protein mobilities in agarose/polyacrylamide gels, and FIG. 7 (right) shows a graph of relative fluorescence units (RFU) vs. location ($\mu$m) for the agarose/polyacrylamide gels of FIG. 7 (left), according to embodiments of the present disclosure.

When agarose was added to the gel, protein mobility was decreased. A 23.4% reduction in mobility was observed from the 0% agarose to the 1% agarose gels. A 46.4% reduction in mobility was observed from the 0% agarose to the 2% agarose gels. FIG. 7 (left) shows images of protein mobilities in the composite agarose/polyacrylamide gels, and FIG. 7 (right) shows a graph of relative fluorescence units (RFU) vs. location (µm) for the composite agarose/polyacrylamide gels.

Figure 8:
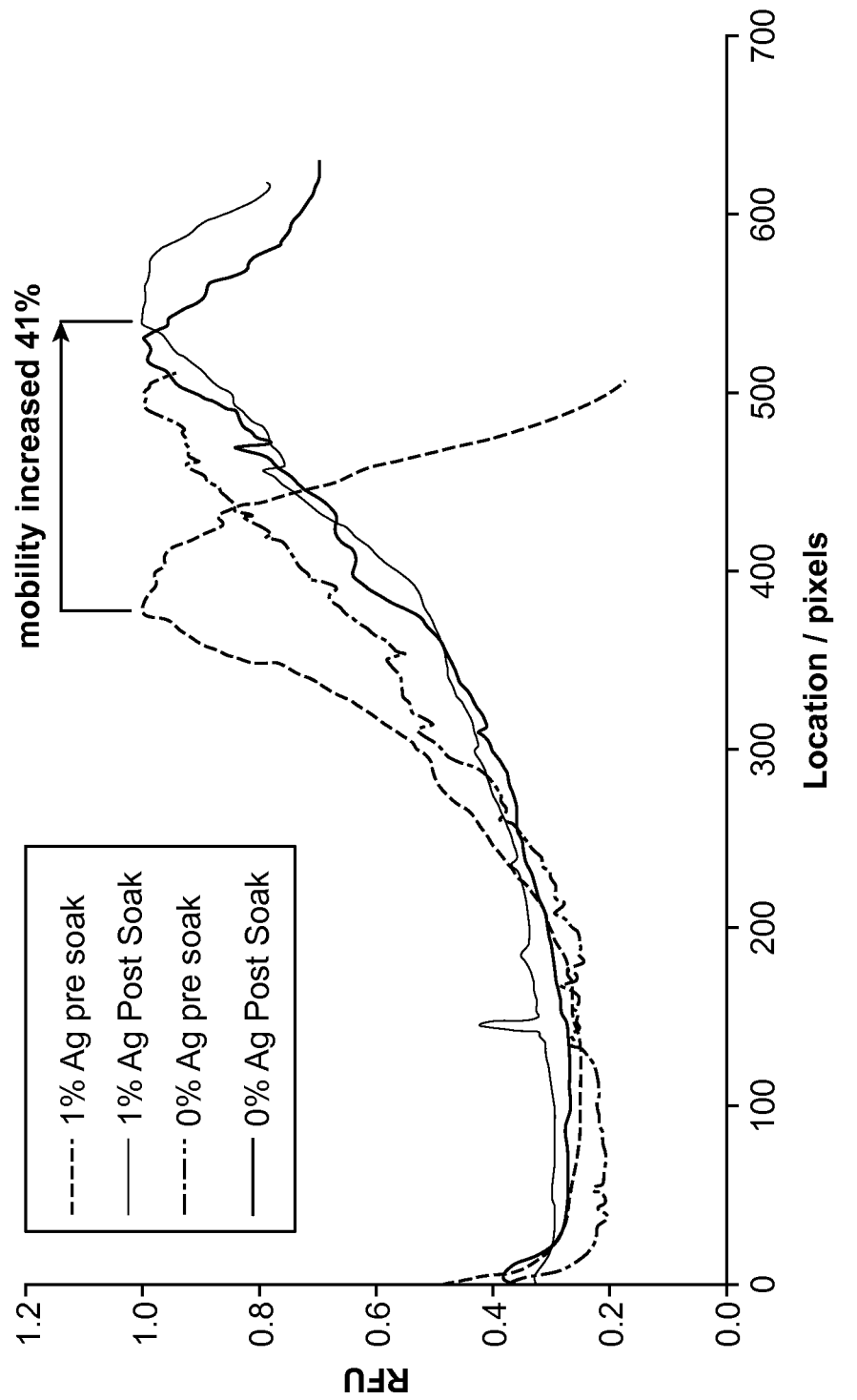
FIG. 8 shows a graph of relative fluorescence units (RFU) vs. location (pixels) for agarose/polyacrylamide gels before and after (pre-soak and post-soak, respectively) application of an applied stimulus (e.g., heat), according to embodiments of the present disclosure.

To test whether the agarose could be removed to induce pore size expansion, gels were soaked in a Tris/glycine bath for 30 minutes at 80° C. After soaking, gels were allowed to cool to room temperature, and the electrophoresis test was performed again and results compared to the gels before heat treatment (e.g., pre-soak vs. post-soak). FIG. 8 shows a graph of relative fluorescence units (RFU) vs. location (pixels) for the composite agarose/polyacrylamide gels. Proteins migrating in the 1% Agarose gel showed a 41% increase in mobility after heat treatment—indicating that pore size expansion had occurred.

Example 3: Diacrylamide Ketal (DK) Polyacrylamide Gel (PAG)

Lyophilized DK product (FIG. 9, panel A, 270.32 kDa molecular weight) was dissolved in a tris caps buffer pH 9.6 at a concentration of 500 mM at room temperature. Dissolution of the mixture was accelerated with a vortex mixer on high speed for five minutes. The final solution, shown in FIG. 9, panel B, had a yellow color. The solution was placed in aliquots at −20° C. for storage. Initially to test DK functionality, 100% DK crosslinked PAG was fabricated with 15% T, 5.82% C, 1% (w/v) VA086 photoinitiator, in a tris glycine buffer. The precursor solution was exposed for 30 seconds at 20 mW/cm$^2$ power. The resulting gel structure included four 5 mm×5 mm×~300 μm height gel pieces attached to GelBond® as shown in in FIG. 9, panel C.

The half-life of DK was 0.03 days at pH 5 and 6 days at pH 7.4 (at 35° C.). To qualitatively confirm decrosslinking functionality, four solutions of tris glycine were titrated to pH values of 8.3, 7.1, 2.6 and 0.07, with the addition of hydrochloric acid. A piece of DK crosslinked PAG was placed into each of the separate solutions to assess dissolution at room temperature. Gels were periodically removed and photographs were taken to qualitatively assess how much gel remained. The gels soaking in 2.6 pH and 0.07 pH Tris Glycine were significantly affected in two minutes, and completely dissolved in 5 minutes. The gels soaking in 8.3 pH and 7.1 pH were not visually affected even after overnight incubation. These qualitative results indicated that the DK molecule was suitable for photo-polymerization and decrosslinking. Experiments were performed to study composite crosslinked PAG.

Example 4: Composite Crosslinked Diacrylamide Ketal PAGs

Substitution of crosslinkers in PAG was performed at a mol per mol basis. For each 1 mg bisacrylamide (BIS) 1.75 mg of DK (molecular weights 154.17 Da and 270.32 Da for BIS and DK, respectively) was substituted. The descriptions for PAGs were typically mass based. The gel density, % T, was the mass percentage of all the monomers in the precursor solution. Gel crosslinking was described by % C, which was the ratio of the crosslinker mass to the all monomers in the gel. As BIS was the predominant crosslinker used for PAGs, the effective BIS PAG % T and % C was maintained so that the experimental conditions would be comparable. The % C* was defined as the BIS effective % C, in equation 1. The % T* was defined such that the changing the ratio of DK and BIS did not impact the total amount of linear acrylamide in the PAG. Equation 2 defines % T*.

$$\% C^* = \frac{BIS_{mg} + \frac{154.17}{270.32}(DK_{mg})}{Acrylamide_{mg} + BIS_{mg} + \frac{154.17}{270.32}(DK_{mg})} *100 \qquad \text{Eq. 1}$$

$$\% T^* = \frac{Acrylamide_{mg} + BIS_{mg} + \frac{154.17}{270.32}(DK_{mg})}{Volume_{\mu L}} *100 \qquad \text{Eq. 2}$$

The design values for % T* and % C* in all gels tested in this chapter, the corresponding masses in the precursor solution and their actual % T and % C values w all shown in Table 3. For each gel composition, the molar percent of DK crosslinker was: % DK=100*$DK_{mol}$/($DK_{mol}$+$BIS_{mol}$).

Table 3: PAG Composition in Composite Crosslinked Gels.

The metric % C used to described the crosslinking of a gel was defined as the ratio of the mass of the crosslinker to the total monomer mass in the gel (including the crosslinkers). The effect of crosslinking in a gel was more closely related to the number of crosslinks (i.e., mols of crosslinker) as opposed the mass of a crosslinker. The acrylamide monomer content was maintained such that for a given % T, a BIS gel and a DK gel would have the same amount of acrylamide monomer. The values, % T* and % C* are described in equation 1 and equation 2, respectively. The actual % T and % C are shown below.

| Design Values | | Molar Crosslinker Percent | Volume | Acrylamide | BIS | DK | Real Values | |
|---|---|---|---|---|---|---|---|---|
| % T* | % C* | % DK | (μL) | (mg) | (mg) | (mg) | % T | % C |
| 16 | 5 | 100 | 1000 | 152.00 | 0.00 | 14.00 | 16.60 | 8.43 |
| 6 | 6 | 99 | 1000 | 56.40 | 0.04 | 6.24 | 6.27 | 10.01 |
| 12 | 6 | 99 | 1000 | 112.80 | 0.07 | 12.47 | 12.53 | 10.01 |
| 16 | 6 | 99 | 1000 | 150.40 | 0.10 | 16.63 | 16.71 | 10.01 |
| 18 | 6 | 99 | 1000 | 169.20 | 0.11 | 18.71 | 18.80 | 10.01 |
| 20 | 6 | 99 | 1000 | 188.00 | 0.12 | 20.79 | 20.89 | 10.01 |
| 12 | 6 | 98 | 1000 | 112.80 | 0.14 | 12.35 | 12.53 | 9.97 |
| 16 | 6 | 98 | 1000 | 150.40 | 0.19 | 16.46 | 16.71 | 9.97 |
| 18 | 6 | 98 | 1000 | 169.20 | 0.22 | 18.52 | 18.79 | 9.97 |
| 20 | 6 | 98 | 1000 | 188.00 | 0.24 | 20.58 | 20.88 | 9.97 |
| 16 | 6 | 90 | 1000 | 150.40 | 0.96 | 15.12 | 16.65 | 9.66 |
| 11 | 3.33 | 0 | 1000 | 106.34 | 3.66 | 0.00 | 11.00 | 3.33 |
| 12 | 3.33 | 0 | 1000 | 116.00 | 4.00 | 0.00 | 12.00 | 3.33 |
| 10 | 3.33 | 0 | 1000 | 96.67 | 3.33 | 0.00 | 10.00 | 3.33 |
| 8 | 3.33 | 0 | 1000 | 77.34 | 2.66 | 0.00 | 8.00 | 3.33 |
| 6 | 3.33 | 0 | 1000 | 58.00 | 2.00 | 0.00 | 6.00 | 3.33 |

Figure 10:
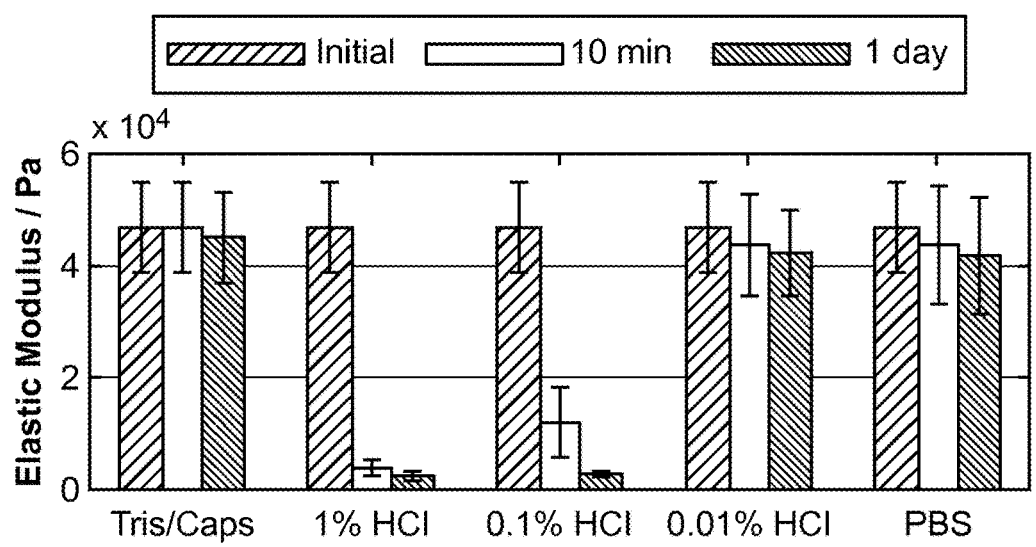
FIG. 10 shows graphs indicating that decrosslinking kinetics of DK in composite PAGs was substantially completed in 10 minutes for the 1% HCl solution. Composite DK and BIS crosslinked PAGs with 16% T*, 6% C*, and a 98% DK crosslinker molar abundances were fabricated in the shape of small gel discs with an 8 mm diameter and a 300 $\mu$m thickness. Gel discs were placed in solutions of tris caps, 1% HCl, 0.1% HCl, 0.01% HCl, and PBS which had pH values of 9.6, 1.1, 2.2, 3.6, and 7.4, respectively.
Figure 10:
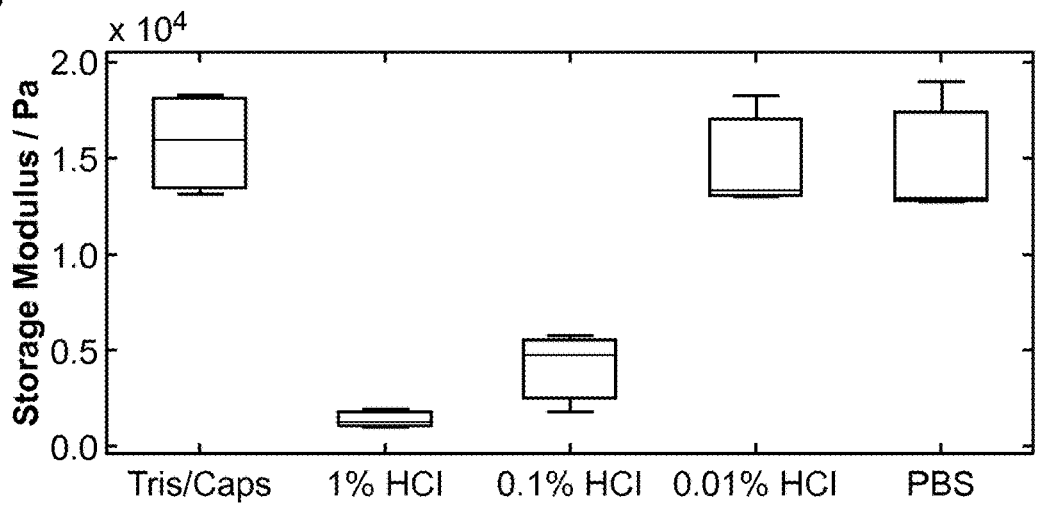
Figure 10:
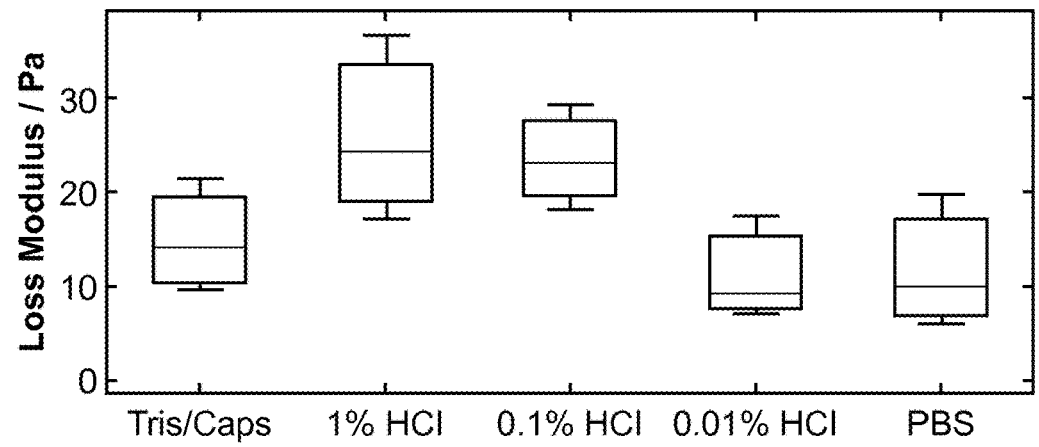

To determine the kinetics of DK decrosslinking when polymerized into a PAG, the mechanical properties of a DK/BIS gel after exposure to buffers of varying acidity were evaluated. 16% T* 6% C* 98% DK composite crosslinked gels were fabricated as 8 mm diameter, 300 μm thick discs such that they would be compatible with an M CR Rheometer (Anton Paar). The storage and elastic modulus was measured at 1 Hz for gels exposed to tris caps, 1% HCl, 0.1% HCl, 0.01% HCl, and PBS (pH values of 9.6, 1.1, 2.2, 3.6, and 7.4, respectively) after 10 minutes and again after 1 day of exposure. The results, shown in FIG. 10, panel A, indicated that the majority of PAG decrosslinking occurred in the first 10 minutes of exposure to 1% HCl. Thus, between 10 minutes and 30 minutes exposure to 1% HCl was used for the decrosslinking steps.

Example 5: Probing Efficiency in Decrosslinked Composite Gels

The composite crosslinked PAGs were used in a scWB assay. The fabrication and operation of the scWB platform is described above. The antibody probing procedure is described below. A 16% T* 6% C* 98% DK PAG was tested using GFP transfected MCF7 cells. After UV immobilization, the gels were scanned for their GFP signal. This step was performed before acid exposure, which eliminated GFP fluorescence. Gels were either decrosslinked in 1% HCl for 10 minutes or left soaking in PBS (control). After decrosslinking, gels were allowed to equilibrate in TBST for 15 minutes. The probing with a primary antibody was performed in TBST with 2% BSA in a 1:20 dilution anti-GFP (ab6673) for 2 hours. A 1 hour wash was then performed on the shaker. Probing with a secondary antibody at a 1:20 dilution of secondary antibody (A21432, anti-goat Alexa Flour 565) was performed for 1 hour, and then was followed by another 1 hour wash. The gels were scanned on a GenePix 4300A.

Figure 11:
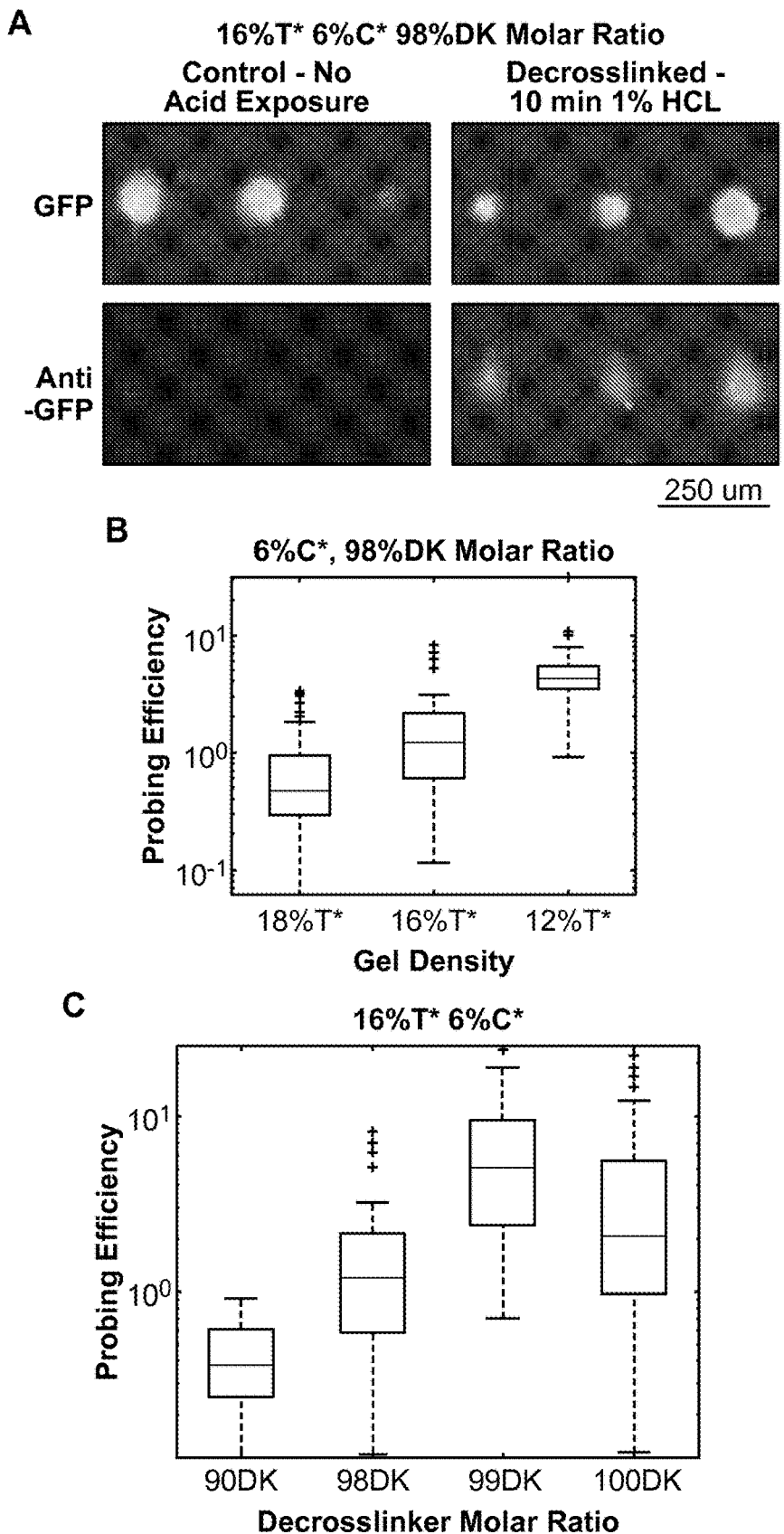
FIG. 11 shows graphs indicating that decrosslinked composite PAG enables probing in dense gels that may not be accessible without decrosslinking.

For the 16% T* 6% C* 98% DK PAG shown in FIG. 11, panel A, no antibody signal was observed for the non-decrosslinked gel. In contrast, significant probing was observed in the decrosslinked gel. The probing efficiency, defined at the antibody signal normalized by the GFP signal for each cell, for 12% T*, 16% T*, and 18% T* was quantified and is shown in FIG. 11, panel B. Despite decrosslinking dense gels, there still existed a gel density probing bias, increasing as gel density was reduced. To determine the optimal % DK, 16% T* 6% C* gels were fabricated, which varied from 90% DK, 98% DK, 99% DK, and 100% DK, and the gels were tested for their respective probing efficiency. The resulting probing efficiency (see FIG. 11, panel C) showed an order of magnitude increase from 90% DK to 99% DK, which was found to be the maximum. The 100% DK had a lower probing efficiency than the 99% DK test case—which may be caused by diffusive losses of GFP which were no longer covalently bound to the hydrogel backbone.

Figure 9:
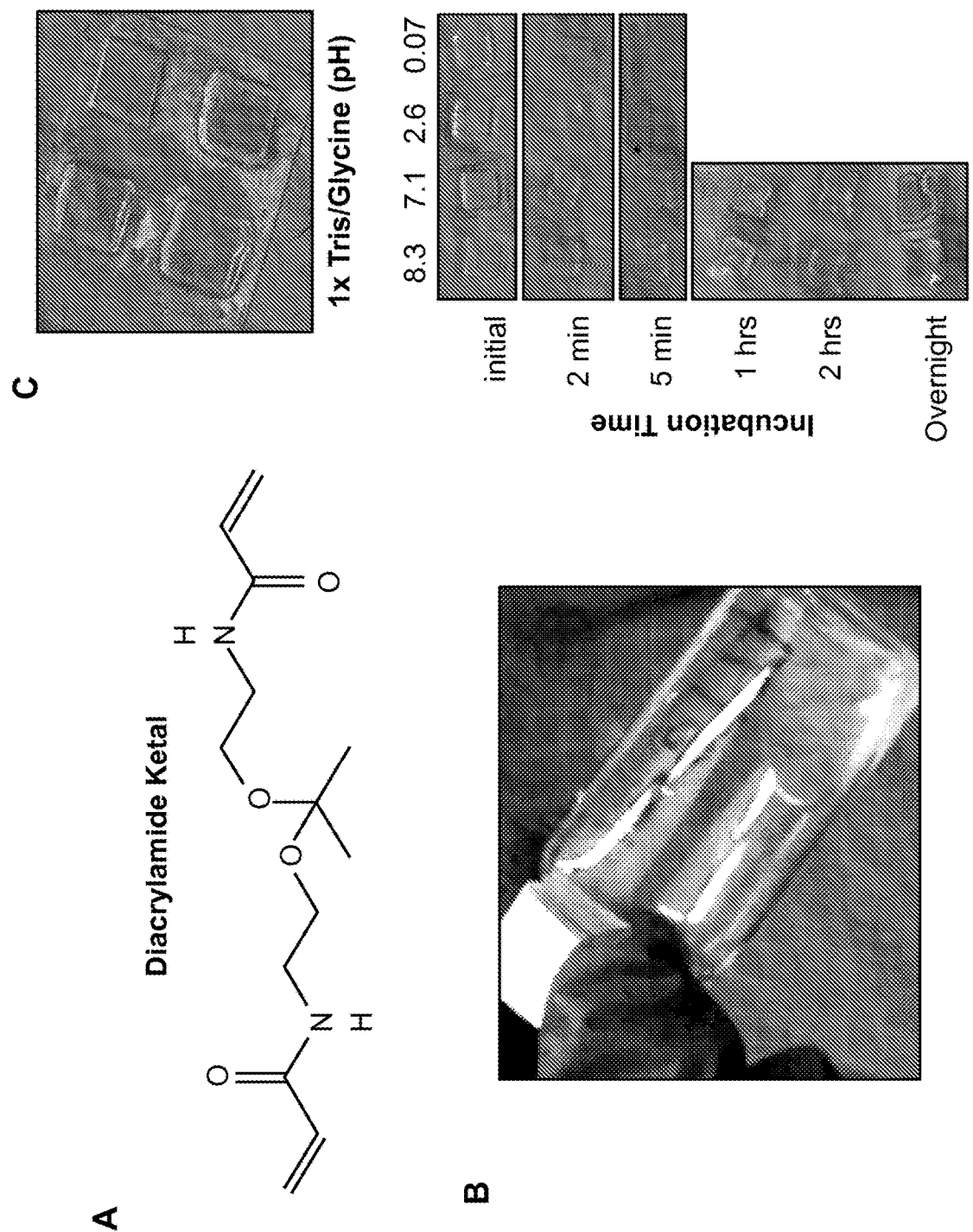
FIG. 9, panel A, shows the chemical structure of diacrylamide ketal (DK). Polyacrylamide gels (PAGs) are compatible with conventional PAG polymerization protocols and solubilize quickly in the presence of an acid.

The 100% DK gel did not completely solubilize, as previously observed in FIG. 9, panel C. This may be due to the substrate the PAG was polymerized on, which was GelBond® and methacrylate functionalized glass slides, and their thickness, ~300 μm and 30 μm, respectively. The 100% DK gel may have entangled linear acrylamide chains still bound to the glass surface.

Example 6: Single Cell Gradient Western Blotting

Figure 12:
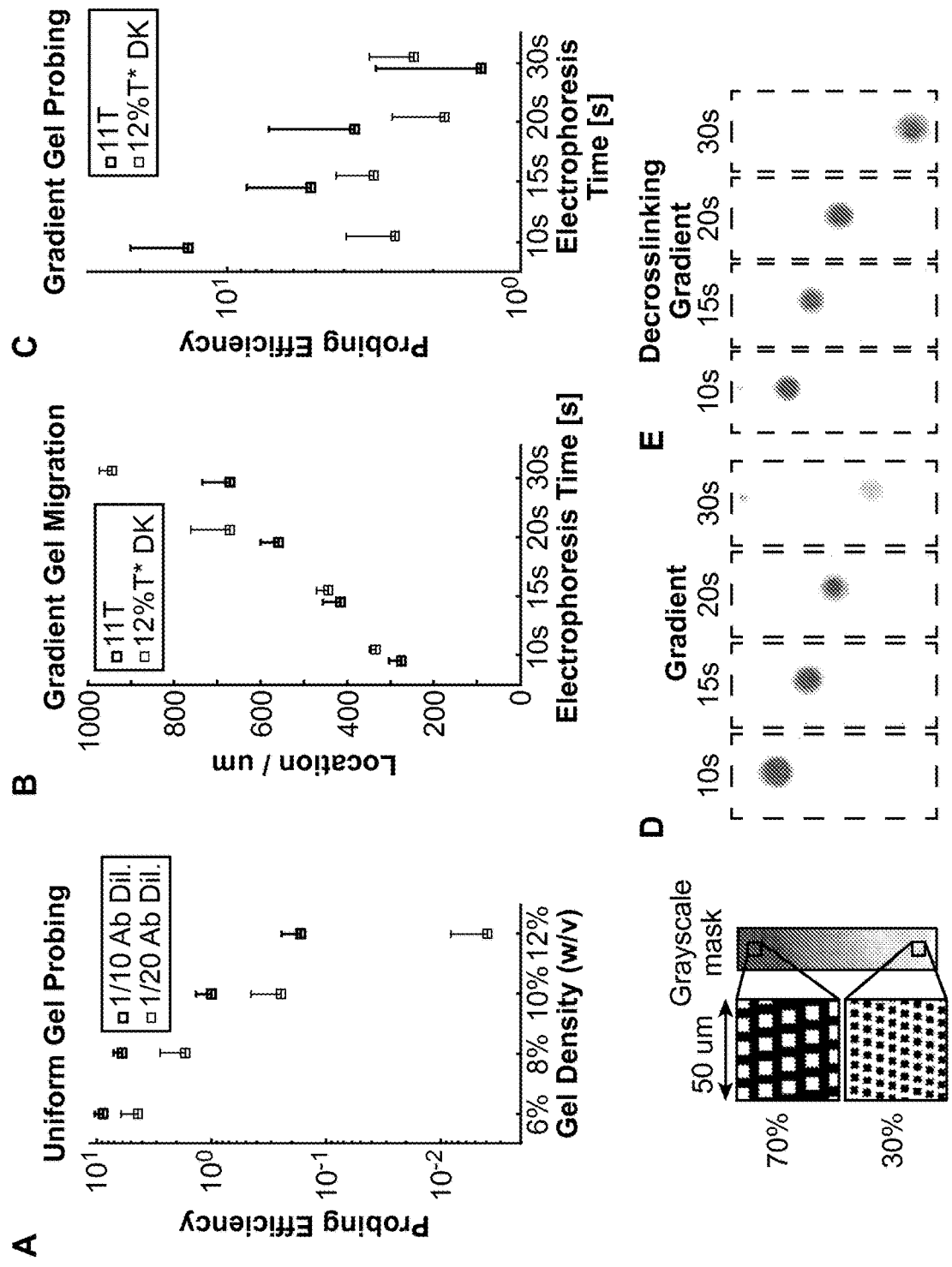
FIG. 12 shows data indicating that expandable-pores mitigate antibody probing bias along the separation axis.

To evaluate the impact of gel density on probing efficiency without decrosslinking, uniform PAG with 6% T, 8% T, 10% T and 12% T gel densities, 3.33% C with 100% BIS were measured. The U373-GFP was probed with antibody dilutions of 1/10 and 1/20, as shown in FIG. 12, panel A. As gel density was increased two-fold, from 6% T to 12% T, probing efficiency decreased two orders and three orders of magnitude for the 1/10 and 1/20 antibody dilutions, respectively. Along with the non-uniform gel density came biased antibody probing for proteins at different locations along the gradient. Probing uniformity with the 11% T gradient gel was tested. GFP was electrophoresed for different times—10 s, 15 s, 20 s and 30 s—to sample different regions of the gradient and then immobilized. Their respective migration distances are shown in FIG. 12, panel B. Probing efficiency was evaluated for each location along the gel in FIG. 12, panel C (1/10 primary antibody dilutions were used). The probing efficiency decreased as proteins advanced into denser regions of the gel. Along the 11% T gel, probing efficiency decreased an order of magnitude from a 13.6 probing efficiency to 1.36.

To address this issue, a similar gradient gel with 99% DK was fabricated. A 12% T* 6% C* gel was polymerized at 26.5 mW/cm² (measured prior to long-pass filter) for 140 seconds through a 70% to 1% grayscale mask. The resulting gel had an effective gel density range of 4.7% T to 8.5% T, as compared a 5.2% T to 9.1% T for the 11% T gradient gel. The 12% T* 6% C* 99% DK gradient was analyzed similarly to the 11% T in FIG. 12. In contrast to the 100% BIS gel, the probing efficiency along the 99% DK gel was not significantly varied, with an initial efficiency of 2.69 at the beginning of the gel and 2.33 at the end of the gel. The decrosslinking step eliminated probing bias for the scGWB platform. The average antibody signal for the 11% T and 12% T* gradients are shown in FIG. 12, panel D and FIG. 12, panel E, respectively.

Figure 13:
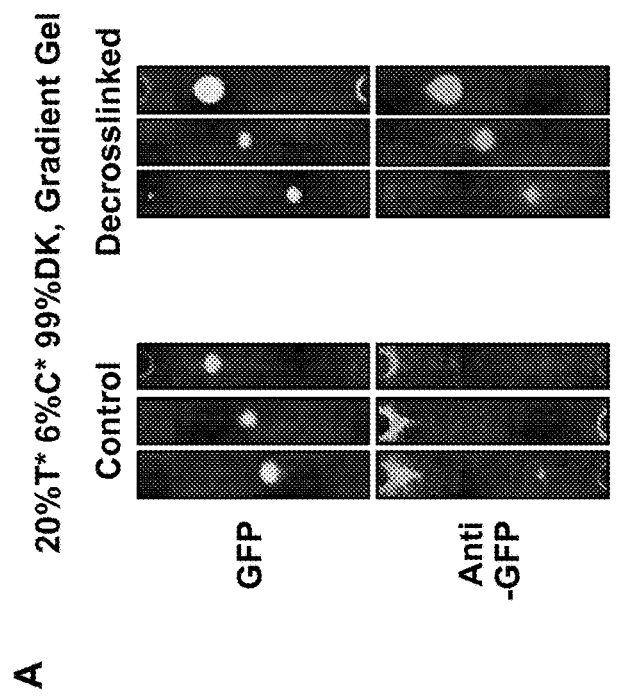
FIG. 13 shows results (n=1) indicating that pore-expansion mitigated probing bias in a dense 99% DK composite crosslinked PAG. A gradient gel fabricated with a precursor solution of 20% T*, 6% C*, 99% DK produced an effective gel density range from 12.4% T to 21.3% T.
Figure 13:
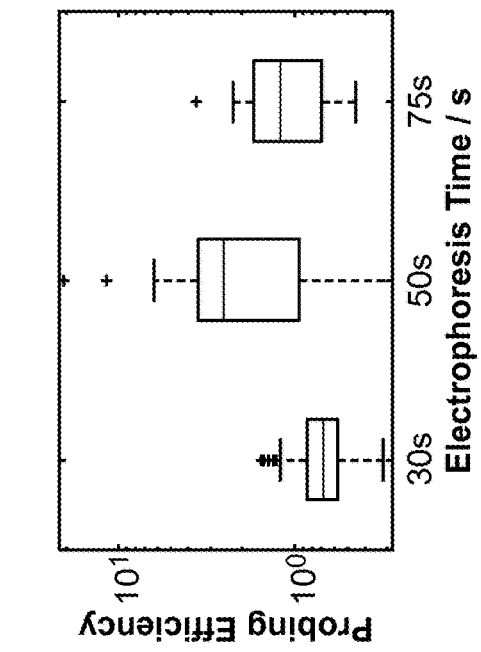

To test a different gradient condition, a gradient gel was fabricated that was not accessible to antibody probing at any location along its separation axis, shown in FIG. 13. The 20% T* 6% C* 99% DK* gel had an effective gel density range from 12.4% T to 21.3% T. U373-GFP was electrophoresed for 30 s, 50 s, and 75 s. Antibody probing in a decrosslinked and non-decrosslinked gel, as shown in FIG. 13, panel A, showed that significant antibody probing was achieved in the decrosslinked gel and no signal was seen for any electrophoresis time in the control case. These results (n=1, technical replicates for each condition), showed a similar probing efficiency across the gradient and indicated that axial bias was not present. This result indicated that polymeric separation media of the present disclosure can be used to resolve small proteins that require a dense sieving matrix (e.g. 6-20 kDa).

Example 7: Large Reagent Delivery

Figure 14:
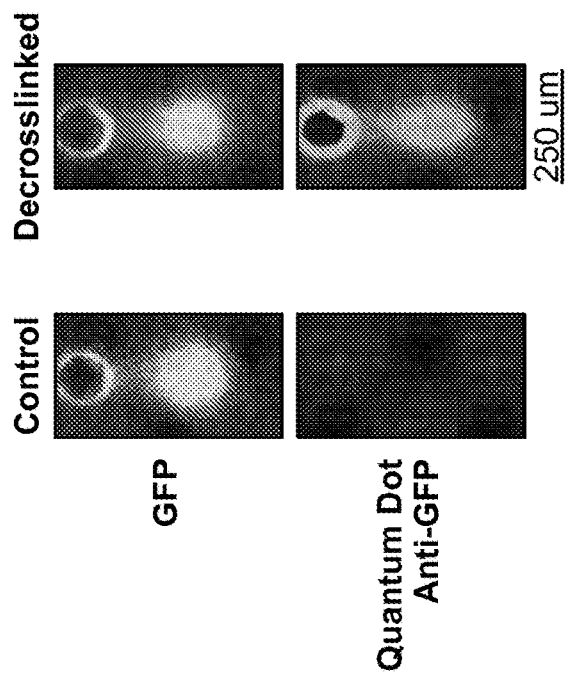
FIG. 14 shows images indicating that decrosslinking PAG facilitated the use of large quantum dots, which may be used for enhanced protein readout. A 6% T* 6% C* and 99DK PAG was used to run a scWB in MCF7-GFP expressing cells. The immobilized GFP was probed with a primary antibody then a secondary antibody attach to a quantum dot (QDot, 20 nm in diameter) for fluorescent readout. The large QDot dot signal was not observed for the non-decrosslinked PAGs, but was observed in the decrosslinked gels.

Experiments were performed to utilize the pore-expansion gels of the present disclosure to introduced larger particles that may facilitate higher sensitivity assays. FIG. 14 shows that decrosslinking PAG can be used to probe with quantum dots. A 6% T* 6% C* 99% DK gel was used to run MCF7-GFP cells. The decrosslinked and the control gels were probed as usual, except a secondary antibody labeled with a 20 nm QDOT (Q22084, Life Technologies, Carlsbad, Calif., USA) at a dilution of 1/5 was used for probing. In the control, no signal was seen, but the QDOT was observed on the decrosslinked gel. This indicated the utility of decrosslinking to introduce larger detection reagents, which may facilitate high sensitivity in-gel assays.

Although the foregoing embodiments have been described in some detail by way of illustration and example for purposes of clarity of understanding, it is readily apparent to those of ordinary skill in the art in light of the teachings of the present disclosure that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A device comprising:
a polymeric separation medium that immobilizes one or more constituents of interest in the polymeric separation medium and has an increased pore size upon application of an applied stimulus,
wherein the polymeric separation medium comprises a non-labile crosslinker configured to crosslink the polymeric separation medium, and a labile crosslinker configured to crosslink the polymeric separation medium and de-crosslink upon application of the applied stimulus, wherein the labile crosslinker comprises N,N'-[(1-methylethylidene)bis(oxy-2,1-ethanediyl)]diacrylamide (DK),
wherein the polymeric separation medium comprises functional groups that covalently bond to one or more of the constituents of interest in the polymeric separation medium.

2. The device of claim 1, wherein the molar ratio of the labile crosslinker to total crosslinker ranges from 0.5 to 0.99.

3. The device of claim 1, wherein the polymeric separation medium has pore size that depends on total crosslinker content, % C, which is 15% C or less before application of the applied stimulus.

4. The device of claim 1, wherein the polymeric separation medium has a pore size that depends on total crosslinker content, % C, which is 5% C or less after application of the applied stimulus.

5. The device of claim 1, wherein the polymeric separation medium comprises a dissolvable polymer.

6. The device of claim 5, wherein the dissolvable polymer comprises a thermoplastic polymer and a thermoset polymer.

7. The device of claim 6, wherein the thermoplastic polymer comprises an agarose gel.

8. The device of claim 1, wherein the polymeric separation medium comprises a swellable polymer.

9. The device of claim 1, wherein the functional groups are light-activated functional groups.

10. The device of claim 1, wherein the labile crosslinker is a moiety that forms bonds between monomers and/or polymers of the polymeric separation medium, wherein the bonds are disrupted upon application of the applied stimulus.

11. A system comprising: a device according to claim 1; and
a detector operatively coupled to the device.

12. A kit comprising: a device according claim 1; and
a packaging configured to contain the device.

13. The kit of claim 12, further comprising instructions for using the device to detect an analyte in a fluid sample.

14. A method of detecting an analyte in a fluid sample, the method comprising:
introducing a fluid sample into a device comprising a polymeric separation medium that immobilizes one or more constituents of interest in the polymeric separation medium and has an increased pore size upon application of an applied stimulus, wherein the polymeric separation medium comprises a non-labile crosslinker configured to crosslink the polymeric separation medium, and a labile crosslinker configured to crosslink the polymeric separation medium and de-crosslink upon application of the applied stimulus, wherein the labile crosslinker comprises N,N'-[(1-methylethylidene)bis(oxy-2,1-ethanediyl)]diacrylamide (DK);
applying an electric field across the polymeric separation medium in a manner sufficient to separate components of the fluid sample in the polymeric separation medium to provide a separated sample;
contacting the polymeric separation medium with the applied stimulus, thereby causing the labile crosslinker to decrosslink and the separation medium to have an increased pore size; and
detecting the analyte in the separated sample.

15. The method of claim 14, further comprising immobilizing the components in the polymeric separation medium.

16. The method of claim 14, wherein the applied stimulus is an acid.

17. The method of claim 14, wherein the detecting comprises labeling the analyte in the separated sample.

18. The method of claim 14, further comprising contacting the separated sample components with one or more secondary reagents.

19. The method of claim 18, wherein the contacting comprises use of one or more of diffusion, electrokinetic transport and hydrodynamic transport.

20. The method of claim 18, wherein the one or more secondary reagents are selected from the group consisting of an affinity probe, a dye, an antibody, an enzyme, an enzyme substrate and a nucleic acid.

21. The method of claim 14, wherein the labile crosslinker is a moiety that forms bonds between monomers and/or polymers of the polymeric separation medium, wherein the bonds are disrupted upon application of the applied stimulus.

22. The method of claim 14, wherein the decrosslinking comprises cleavage of a covalent bond formed by the labile crosslinker.

23. The method of claim 14, wherein the functional groups are light-activated functional groups.

24. The method of claim 23, wherein the light-activated functional groups are activated by UV light.

* * * * *